(12) United States Patent
Wilker et al.

(10) Patent No.: US 11,193,737 B2
(45) Date of Patent: *Dec. 7, 2021

(54) SENSORIALLY ATTRACTIVE PUNCTURE-RESISTANT PANEL

(71) Applicants: Erik W. Wilker, Lexington, MA (US); Nancy C. Wilker, Lexington, MA (US)

(72) Inventors: Erik W. Wilker, Lexington, MA (US); Nancy C. Wilker, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,419

(22) Filed: May 1, 2020

(65) Prior Publication Data
US 2020/0326161 A1  Oct. 15, 2020

Related U.S. Application Data

(63) Continuation of application No. 16/068,510, filed as application No. PCT/US2017/012803 on Jan. 10, 2017, now Pat. No. 10,690,453.

(Continued)

(51) Int. Cl.
| | |
|---|---|
| *F41H 5/08* | (2006.01) |
| *F41H 1/02* | (2006.01) |
| *B32B 7/08* | (2019.01) |
| *F41H 5/04* | (2006.01) |
| *A63H 3/02* | (2006.01) |

(52) U.S. Cl.
CPC .............. *F41H 5/08* (2013.01); *B32B 7/08* (2013.01); *F41H 1/02* (2013.01); *F41H 5/04* (2013.01); *A63H 3/02* (2013.01); *B32B 2307/581* (2013.01); *B32B 2451/00* (2013.01); *F41H 5/0414* (2013.01); *F41H 5/0485* (2013.01)

(58) Field of Classification Search
CPC . F41H 5/08; F41H 5/04; F41H 5/0414; F41H 5/0485; F41H 1/02; B32B 7/08; B32B 2307/581; B32B 2451/00; A63H 3/02; A41D 15/04
USPC ........... 89/36.01, 36.02, 36.03, 36.04, 36.05; 2/455, 2.5; 428/911
See application file for complete search history.

(56) References Cited

U.S. PATENT DOCUMENTS 4,475,247 A * 10/1984 Lee ...................... F41C 33/06
                                                              2/2.5
4,590,633 A *  5/1986 Pickens ................ A47G 9/0207
                                                            446/369

(Continued)

OTHER PUBLICATIONS

International Searching Authority—International Search Report and the Written Opinion of the International Searching Authority, Application No. PCT/US17/12803, dated Apr. 7, 2017, 12 pages.

*Primary Examiner* — John Cooper
(74) *Attorney, Agent, or Firm* — Sunstein LLP

(57) ABSTRACT

In a first aspect, the invention provides a sensorially attractive puncture-resistant panel having a first surface and a second surface, wherein at least one of the first surface and the second surface is sensorially attractive. In some embodiments, the panel comprises, consists, or consists essentially of a first layer having a first surface and a second surface, wherein at least one of the first surface and the second surface is sensorially attractive, and a second layer that is puncture-resistant and comprises, consists, or consists essentially of a puncture-resistant material. In some embodiments, the panel is sensorially attractive to a child.

5 Claims, 16 Drawing Sheets

Related U.S. Application Data

(60) Provisional application No. 62/277,054, filed on Jan. 11, 2016.

(56) References Cited

U.S. PATENT DOCUMENTS

| | | | | |
|---|---|---|---|---|
| 4,683,800 | A * | 8/1987 | Snedeker | F41H 5/04 428/911 |
| 5,093,947 | A * | 3/1992 | Henegar | A47G 9/083 5/413 R |
| 5,123,117 | A * | 6/1992 | Prendergast | A45F 4/12 2/108 |
| 5,554,816 | A * | 9/1996 | Skaggs | F41H 5/08 109/49.5 |
| 5,911,197 | A * | 6/1999 | Schmid | A41D 13/08 119/712 |
| 6,421,852 | B1 * | 7/2002 | Shao | A63H 3/005 446/73 |
| 6,434,769 | B1 * | 8/2002 | Koenig | A47D 15/00 446/369 |
| 6,523,180 | B1 * | 2/2003 | Christopher | A01K 15/02 119/714 |
| 6,918,355 | B1 * | 7/2005 | Arvanites | A01K 15/026 119/707 |
| 7,461,421 | B1 * | 12/2008 | Faircloth | A47G 9/1045 5/630 |
| 7,870,839 | B2 * | 1/2011 | Sacra | A01K 15/025 119/709 |
| 8,210,088 | B1 * | 7/2012 | Keyfauver | F41H 5/08 89/36.05 |
| 9,943,069 | B2 * | 4/2018 | Zhang | A01K 15/025 |
| 10,098,441 | B1 * | 10/2018 | Holloman | A45C 9/00 |
| 2002/0152546 | A1 * | 10/2002 | Durkin | A41D 13/0581 2/455 |
| 2004/0055079 | A1 * | 3/2004 | Haaga | A41D 13/1161 2/455 |
| 2012/0131733 | A1 * | 5/2012 | Mertz | A41B 13/10 2/455 |
| 2012/0132066 | A1 * | 5/2012 | Seuk | F41H 1/02 89/36.05 |
| 2012/0289116 | A1 * | 11/2012 | Beuerle | A63H 3/003 446/72 |
| 2013/0189898 | A1 * | 7/2013 | Abbott | A47G 9/0207 446/73 |
| 2014/0084646 | A1 * | 3/2014 | Benden | F41H 1/02 297/217.1 |
| 2014/0130748 | A1 * | 5/2014 | Curry | A01K 15/025 119/707 |
| 2014/0150154 | A1 * | 6/2014 | Aquino | F41H 1/02 2/2.5 |
| 2015/0338193 | A1 * | 11/2015 | Walker | F41H 5/08 89/36.02 |
| 2016/0304275 | A1 * | 10/2016 | Williams | D03D 1/04 |
| 2017/0079244 | A1 * | 3/2017 | Mullin | A01K 15/026 |
| 2017/0319973 | A1 * | 11/2017 | Perez | A47G 9/10 |
| 2017/0354277 | A1 * | 12/2017 | Wagner | A47C 16/00 |
| 2018/0000233 | A1 * | 1/2018 | Yilla | A45F 4/08 |
| 2018/0049554 | A1 * | 2/2018 | Igbinevbo | A47C 7/42 |
| 2018/0103690 | A1 * | 4/2018 | Hyslop | A45F 5/02 |
| 2018/0372455 | A1 * | 12/2018 | Klassen | F41H 5/013 |

* cited by examiner

SENSORIALLY ATTRACTIVE PUNCTURE-RESISTANT PANEL

CROSS-REFERENCE TO RELATED APPLICATIONS

This application is a continuation of U.S. patent application Ser. No. 16/068,510, which is a U.S. national stage entry under 35 U.S.C. § 371 of International Application No. PCT/US2017/012803 filed Jan. 10, 2017, which claims priority to U.S. provisional patent application Ser. No. 62/277,054 filed Jan. 11, 2016. The entire contents of each of these applications are hereby incorporated by reference herein, for all purposes.

BACKGROUND

The present invention relates to the garment and accessory industry for human and animal clothing and baggage.

As technology increases, and weapons become more commonplace, people and animals are subjected to increased risk of injury from accidental or intentional puncture wounds from projectile objects such as bullets, knives, or shards of metal or glass from exploding objects.

It would be useful to have objects for protecting people and animals from puncture wounds from projectile objects.

SUMMARY OF THE EMBODIMENTS

In some embodiments, the invention provides a puncture-resistant panel that is sensorially attractive. The panel can be an accessory, such as a pillow or toy, or can be a garment or baggage. By being sensorially attractive, the panel is used more frequently, and is therefore more likely to be close at hand should a puncture wound-causing event occur.

Accordingly, in one aspect, the invention provides a sensorially attractive puncture-resistant panel having a first surface and a second surface, wherein at least one of the first surface and the second surface is sensorially attractive.

In some embodiments, the panel comprises, consists, or consists essentially of (a) a first layer having a first surface and a second surface, wherein at least one of the first surface and the second surface is sensorially attractive, and (b) a second layer that is puncture-resistant and comprises, consists, or consists essentially of a puncture-resistant material.

In some embodiments, the sensorially attractive panel or sensorially attractive layer is tactilely attractive and/or visually attractive.

In some embodiments, the panel is sensorially attractive to a human child, such as a child between about 5 and about 10 years of age, or between about 8 and about 14 years of age, or between about 12 and 19 years of age. In some embodiments, the child is a teenager.

In some embodiments, the panel is sensorially attractive to an adult human, such as an adult between about 18 to about 21 years of age, or an adult between about 20 to about 35 years of age, or an adult between about 30 to about 45 years of age, or an adult between about 40 to about 60 years of age, or an adult between about 55 to about 75 years of age, or an adult between about 65 to about 100 years of age.

In some embodiments, the panel is sensorially attractive to a non-human animal, such as a pet (e.g., cat, dog, horse, or marine mammal).

In some embodiments, the puncture-resistant panel or puncture-resistant layer is bullet-resistant.

In some embodiments, the panel comprises at least one fastener. In some embodiments, the fastener is configured to attach the panel to a strap, or a garment, or a bag. In some embodiments, the panel is configured to attach to a strap, or a garment, or a bag.

In some embodiments, the first layer is permanently or non-permanently attached to the second layer.

In some embodiments, the panel further comprises a third layer having a first surface and a second surface, wherein at least one of the first surface and the second surface is sensorially attractive (e.g. is visually and/or tactilely attractive). In some embodiments, the first layer is permanently attached to the third layer along at least about 5% of a total edge of the first layer or the third layer. In some embodiments, the first layer and the third layer form a sleeve into which the second layer can be inserted to non-permanently (e.g., reversibly) or permanently attach the second layer to the first layer and the third layer.

In another aspect, the invention provides a sleeve comprising a first layer and a second layer, each of the first second layers comprising an internal surface and an external surface, the sleeve configured for insertion of a puncture-resistant layer to form a sensorially attractive puncture-resistant panel, wherein the external surface of at least one of the first layer and the second layer is sensorially attractive. In some embodiments, at least one of the first layer and second layer of the sleeve is padded or stuffed.

In some embodiments, the sleeve resembles a cartoon character or an animal. In some embodiments, the internal surface of at least one of the first layer or second layer comprises a fastener for attaching to the puncture-resistant layer following insertion.

In another aspect, the invention provides a sensorially attractive puncture-resistant panel comprising a puncture-resistant layer sandwiched between at least two sensorially attractive layers. In some embodiments, at least one of the sensorially attractive layers is a layer of stuffing.

In another aspect, the invention provides a puncture-resistant layer having an edge, a first surface and a second surface, the puncture-resistant layer configured for attachment to at least one sensorially attractive layer. In some embodiments, the layer comprises at least one fastener to attach the puncture-resistant layer to the at least one sensorially attractive layer. In some embodiments, the at least one fastener is located on the edge, the first surface, and/or the second surface of the puncture-resistant layer. In some embodiments, the layer comprises at least one hole through which a string can be threaded to attach the puncture-resistant layer to the at least one at least one sensorially attractive layer.

In yet another aspect, the invention provides a method for making a sensorially attractive puncture-resistant panel comprising (a) providing a puncture-resistant material and (b) forming the material into a panel that is sensorially attractive. In some embodiments, the puncture-resistant material of step (a) is a puncture-resistant layer and step (b) comprises modifying at least one surface of the layer of step (a) so that it is sensorially attractive. In some embodiments, step (b) comprises painting or drawing on the layer of step (a). In some embodiments, step (b) comprises attaching a sensorially attractive object to the layer of step (a).

In some embodiments, the attaching of step (b) is permanently attaching or non-permanently attaching.

In yet another aspect, the invention provides a method for making a sensorially attractive puncture-resistant panel comprising (a) providing a puncture-resistant material, and (b) layering the material of step (a) onto a first surface of a layer, said layer comprising a sensorially attractive second surface, wherein the product of step (b) is a sensorially attractive puncture-resistant panel comprising a sensorially attractive second surface and a first surface layered with the puncture-resistant material.

In yet another aspect, the invention provides a method for making a sensorially attractive puncture-resistant panel comprising (a) providing a puncture-resistant material, and (b) layering the material of step (a) onto a first surface of a layer, said layer being in a shape that is sensorially attractive.

In yet another aspect, the invention provides a method for making a sensorially attractive puncture-resistant panel comprising (a) providing a layer comprising puncture-resistant material, and (b) inserting the puncture-resistant layer into a sleeve comprising an opening, an internal edge, two internal surfaces and two outside surfaces, wherein at least one of the two outside surfaces is sensorially attractive and wherein the puncture resistant material layer is sandwiched between the two internal surfaces in the sleeve. In some embodiments, the opening of the sleeve is permanently or non-permanently closed after the insertion of the puncture-resistant material layer. In some embodiments, the puncture-resistant layer comprises a fastener that attaches to the interior edge or at least one of the two interior surfaces of the sleeve.

BRIEF DESCRIPTION OF THE DRAWINGS

The foregoing features of embodiments will be more readily understood by reference to the following detailed description, taken with reference to the accompanying drawings, in which.

DETAILED DESCRIPTION

Figure 1:
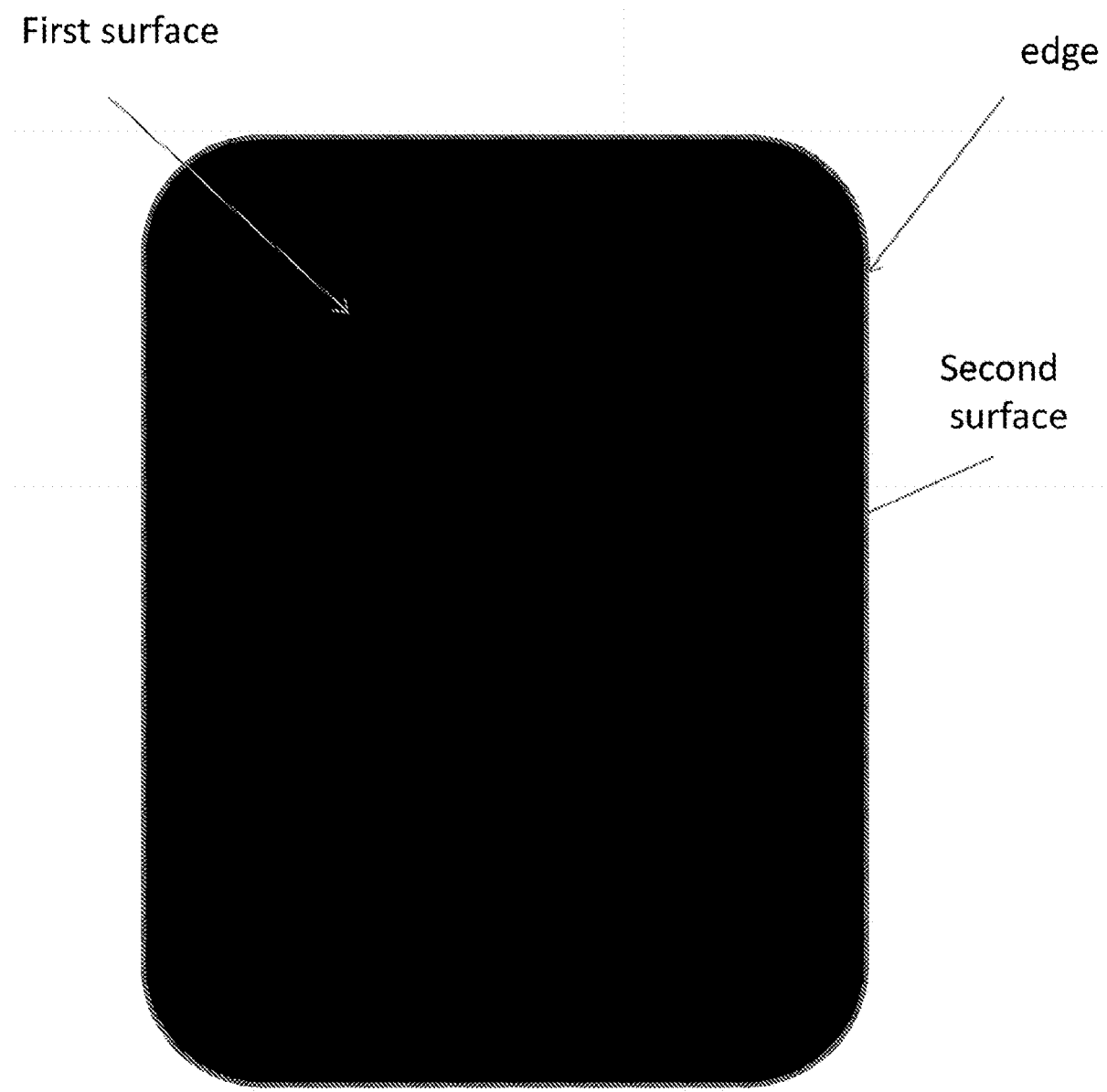
FIG. 1 is a diagram depicting a puncture-resistant layer of the present invention taken from a front perspective.

Given that the risk of injury to children and young adults at their places of education (e.g., school or university) has risen dramatically in the past decade, it would be useful to have puncture-resistant garments and backpacks available to a child or a young adult.

Puncture-resistant vests and puncture-resistant back packs are currently commercially available. However, these commercially available products are uncomfortable to wear and/or are heavy. A bullet-proof panel for insertion into a backpack that is marketed under the name BulletSafe is also available. However, the panel is unattractive and not appealing to children. Moreover, because the purpose of the puncture-resistant products currently available is obvious, explaining to a child why he or she must carry and/or wear the product to school may instill fear and anxiety in the child, and possibly affect the psychological well-being of a child. Moreover, as many children are already inclined to dislike school (e.g., considering it fun to play than to learn at school), being fearful of injury at school will only crease a child's reluctant to go to school.

Accordingly, the inventors have developed a puncture-resistant panel that is sensorially attractive. Because of its attractiveness, the user of the panel may forget that it is intended for safety an may, instead, perceive it as an desirable possession, comparable to a stuffed animal or a plastic sleeve holding baseball cards.

The further aspects, advantages, and embodiments of the invention are described in more detail herein. The patents, published applications, and scientific literature referred to herein establish the knowledge of those with skill in the art and are hereby incorporated by reference in their entirety to the same extent as if each was specifically and individually indicated to be incorporated by reference. Any conflict between any reference cited herein and the specific teachings of this specification shall be resolved in favor of the latter.

Terms defined or used in the description and the claims shall have the meanings indicated, unless context otherwise required. Technical and scientific terms used herein have the meaning commonly understood by one of skill in the art to which the present invention pertains, unless otherwise defined. Any conflict between an art-understood definition of a word or phrase and a definition of the word or phrase as specifically taught in this specification shall be resolved in favor of the latter. As used herein, the following terms have the meanings indicated. As used in this specification, the singular forms "a," "an" and "the" specifically also encompass the plural forms of the terms to which they refer, unless the content clearly dictates otherwise. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

In a first aspect, the invention provides a sensorially attractive puncture-resistant panel having a first surface and a second surface, wherein at least one of the first surface and the second surface is sensorially attractive. In some embodiments, the panel comprises, consists, or consists essentially of (a) a first layer having a first surface and a second surface, wherein at least one of the first surface and the second surface is sensorially attractive, and (b) a second layer that is puncture-resistant and comprises, consists, or consists essentially of a puncture-resistant material. In some embodiments, the surface of the first layer that is not sensorially attractive is the surface that is attached to the second layer. In some embodiments, the sensorially attractive panel or sensorially attractive layer is tactilely attractive and/or visually attractive.

Figure 2:
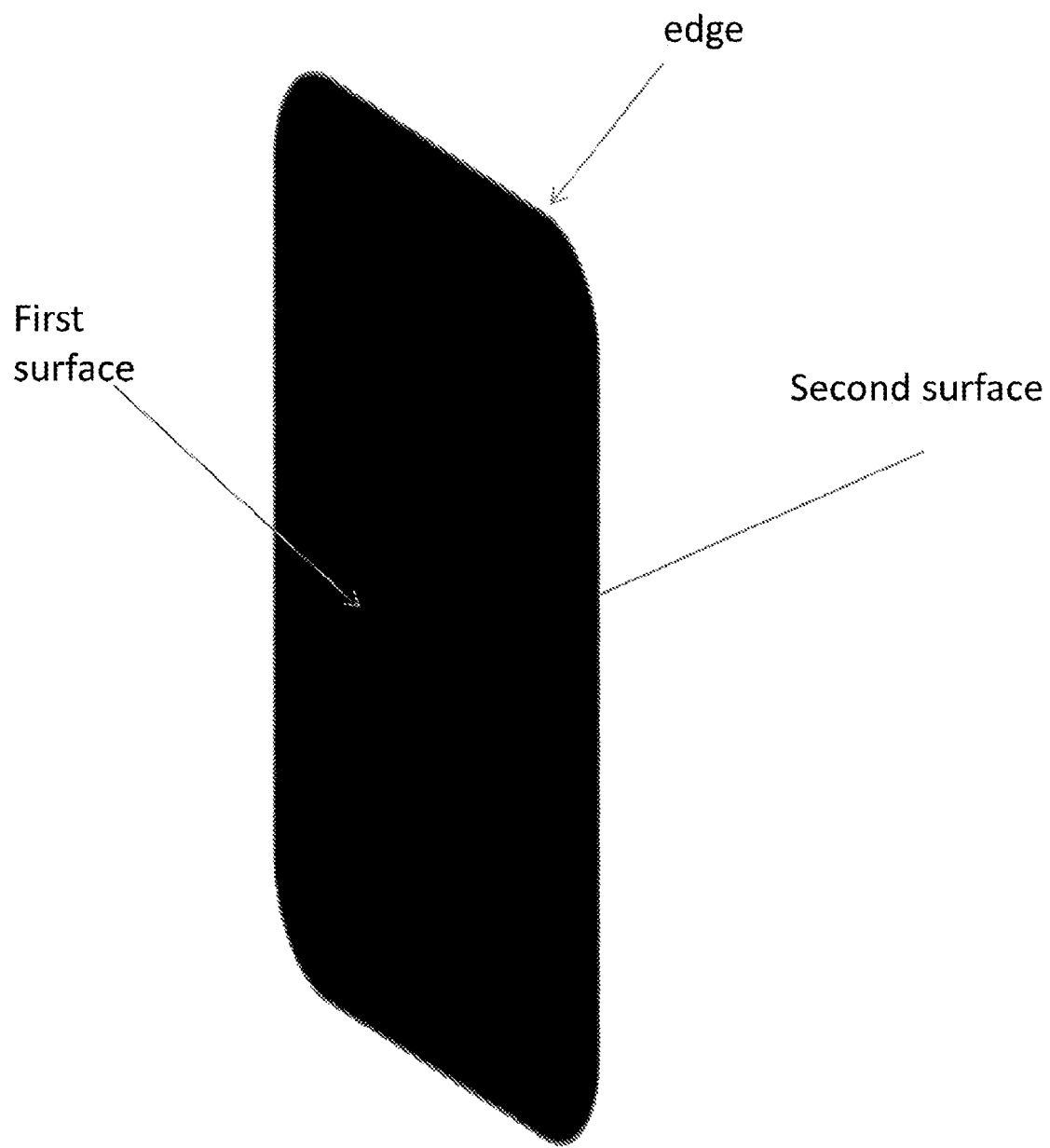
FIG. 2 is a diagram depicting a puncture-resistant layer of the present invention taken from a side perspective.

FIGS. 1 and 2 are diagrams depicting a puncture-resistant layer of the present invention taken from a front perspective (FIG. 1) and from the side perspective (FIG. 2). As can be seen, the puncture-resistant layer (i.e., a layer comprising puncture-resistant material) has an edge, a first surface and a second surface. These same features (e.g., first surface, side surface, and edge) are also on a sensorially attractive layer and a sensorially attractive puncture-resistant panel, As used herein, by "panel" is meant a sheet having one or more layers that can be laid relatively flat when one surface of the panel is laid on a flat surface (e.g., a table top), where the surface of the flat surface that contacts the panel is at least the same size as the surface of the panel. In some embodiments, the panel is rigid. In some embodiments, the panel is flexible.

Note that in some embodiments, the sensorially attractive puncture-resistant panel, or the sensorially attractive layer may include or may be a layer of padding or stuffing. Hence, by a panel or layer being "relatively flat" means that at least 40%, or at least 50%, or at least 65%, or at least 75%, or at least 85%, or at least 90%, or at least 95% of the surface area of the panel or layer is horizontal to the plane of the flat surface upon which the panel or layer is placed (e.g., the flat surface may be a table top).

As used herein, by "sensorially attractive" is meant that the panel or the layer described herein is attractive (e.g., appealing or pleasing) to the senses (e.g., sight, hearing, taste, smell, and touch) of an individual contacting the panel (e.g., touching the panel, smelling the panel, or seeing the panel). In some embodiments, the individual to whom the panel or layer is sensorially attractive is the intended user of the panel or layer (e.g., the individual who is wearing the garment or using the bag or pillow that may incorporate the panel or layer). In some embodiments, the individual to whom the panel or layer is sensorially attractive is not the intended user of the panel or layer. In one non-limiting example, the individual who is not the user may be the parent of a three year old child choosing a panel for, for example, inclusion in the child's preschool backpack. The individual who is a user may also be the child who will be the user of the panel. The individual who is not a user may also be the owner of a horse choosing panel that will be incorporated into a saddle for the horse (where the horse is the user).

Accordingly, in another aspect, the invention provides a method for making a sensorially attractive puncture-resistant panel comprising providing a puncture-resistant material and forming the material into a panel that is sensorially attractive.

In some embodiments, a sensorially attractive puncture-resistant panel according to the present invention can be made by obtaining a sensorially attractive layer (e.g., a photograph of a family member), and apply one or more layers of the graphene to the back of the photograph by simply painting it on. In yet another aspect, the invention provides a method for making a sensorially attractive puncture-resistant panel comprising providing a puncture-resistant material, and layering the puncture-resistant material onto a first surface of a layer, said layer being in a shape that is sensorially attractive.

In another example, the sensorially attractive layer may be painted or printed directly onto a puncture-resistant layer to produce a sensorially attractive puncture-resistant panel.

In other words, the sensorially attractive puncture-resistant panel can be made by simply obtaining one layer, either a sensorially attractive layer or a puncture-resistant layer, and modifying the layer by adding a layer of a puncture-resistant layer to the sensorially attractive layer or adding a sensorially attractive layer to the puncture-resistant layer. Both will result in a sensorially attractive puncture-resistant panel.

In some embodiments, the invention including modifying at least one surface of a puncture-resistant layer (i.e., comprising, consisting, or consisting essentially of a puncture-resistant material) so that it is sensorially attractive.

In some embodiments, the sensorially attractive puncture-resistant panel is sensorially attractive because its shape. The sensorially attractive puncture-resistant panel, when the panel is flexible, can be of any shape. In some embodiments, the shape of the panel can be rectangular (e.g., having 90.degree. corners, or having rounded corners, but retaining a rectangular shape). Of course, a squarish shape is rectangular shape.

Figure 3:
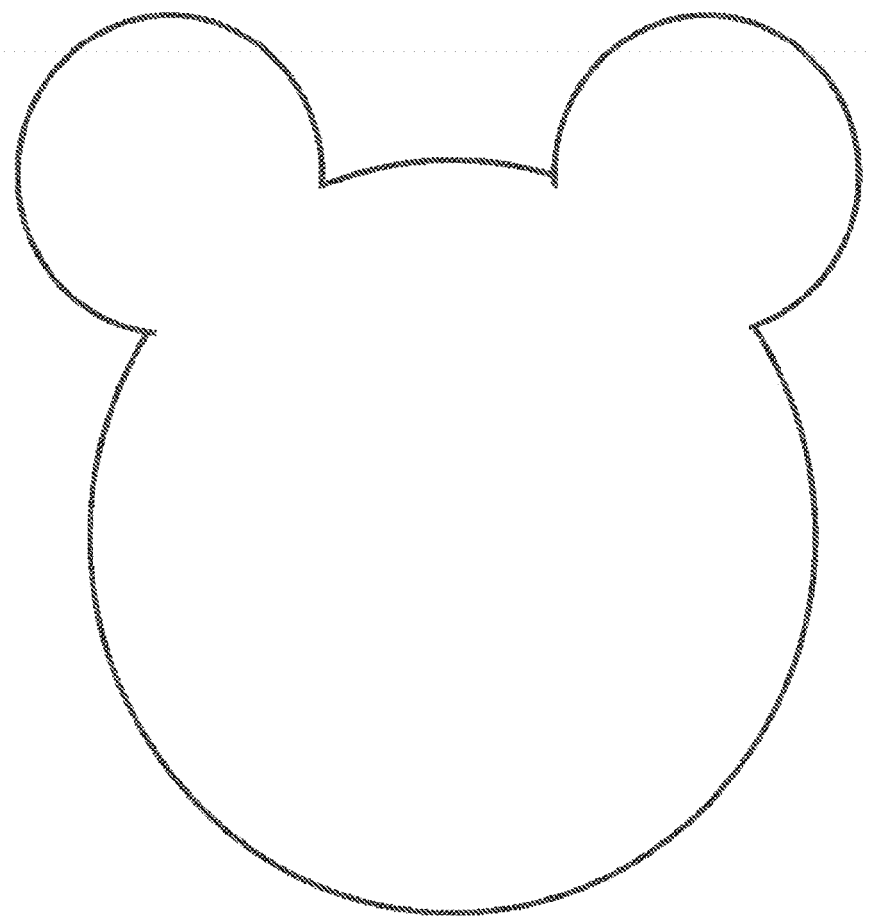
FIG. 3 is a diagram showing a non-limiting sensorially attractive puncture-resistant panel that is a single layer of a puncture-resistant material in a sensorially attractive shape. The non-limiting shape depicted in FIG. 3 may be, for example, the two-dimensional outline of a water molecule (H.sub.2O), or the outline of the head of Mickey Mouse.

FIG. 3 is a diagram showing a non-limiting sensorially attractive puncture-resistant panel that is a single layer comprising, consisting, or consisting essentially of a puncture-resistant material in a sensorially attractive shape. The non-limiting shape depicted in FIG. 3 may be, for example, the two-dimensional outline of a water molecule ($H_2O$), or the outline of the head of an animal with a rounded face and round ears (e.g., the head of a tiger or the head of Mickey Mouse).

In some embodiments, the shape of the panel can be, without limitation, oval, eliptical, polygonal (e.g., hexagonal, octagonal, hepatagonal, eqilateral, equiangular, star shaped, etc.). In some embodiments, the sides of the polygonal shape are equal in length. In some embodiments, the sides of the polygonal shape are not equal in length. In some embodiments, the shape can be irregular and may comprise one or more of the following: a straight side, a curved side, a concave angle, and a convex angle.

In some embodiments, the shape of the panel may be symmetrical across an axis (e.g., a vertical axis or a horizontal axis). In some embodiments, the shape of the panel may be asymmetrical.

In some embodiments, the panel described herein is not rectangular. In some embodiments, the sensorially attractive puncture-resistant panel described herein does not include any 90 degree corners.

Figure 4:
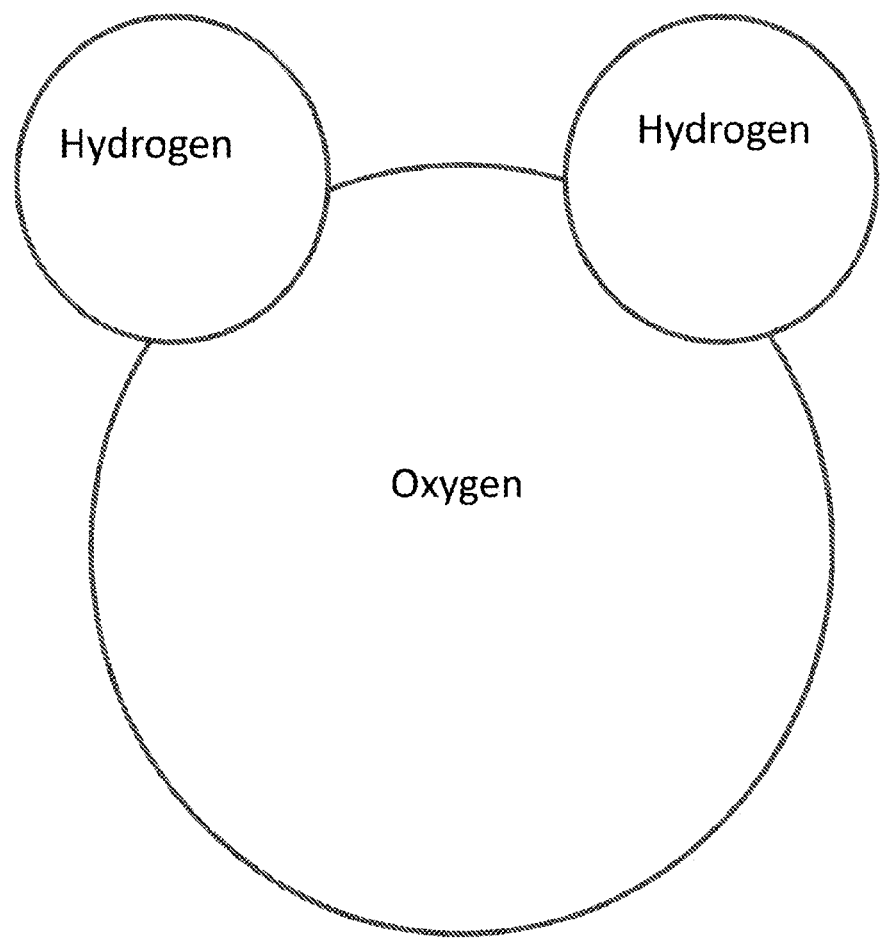
FIG. 4 depicts the shape as depicted in FIG. 3, where the two hydrogen circles are completed and all three circles are labeled with the names of the atoms.

One non limiting puncture-resistant panel in a shape that is sensorially attractive may be, e.g., the shape in the two-dimensional outline of a shape filling model of a water molecule, where the oxygen atom is depicted as a large circle and the hydrogen atoms are depicted as two smaller circles located at approximately 45.degree.-65.degree. angles to each other that touch the larger oxygen atom circle. The shape depicted in FIG. 3 may be a two-dimensional space filled model of a water molecule, where the hydrogen atom circles are depicted as partial circles merging with the larger oxygen atom circles. FIG. 4 depicts the shape as depicted in FIG. 3, where the two hydrogen circles are completed and all three circles are labeled with the names of the atoms. Note that the lines closing the circles and the lines drawing names of the atoms hydrogen and oxygen in the non-limiting panel depicted in FIG. 4 may be considered a layer of the panel, where the panel comprises a layer underlying the names of the atoms that comprises, consists, or consists essentially of the puncture-resistant material. In this embodiment depicted in FIG. 4, the surface space occupied by the sensorially attractive layer of the labels hydrogen, hydrogen, and oxygen is smaller than the surface of the puncture-resistant layer onto which it is attached.

Other space filling molecules can be used for shapes for a sensorially attractive puncture-resistant panel of the present invention. In these shaped embodiments, the sensorially attractive puncture-resistant panel may be only a single layer in thickness.

In some embodiments, the sensorially attractive puncture-resistant panel is tactilely attractive. For example, one or both surfaces of the panel or layer may be soft to the touch (e.g., velvety), or may be furry, or may be padded or stuffed.

In some embodiments, the sensorially attractive puncture-resistant panel is sensorially attractive to more than one sense. For example, a panel may be in an attractive shape (e.g., visually and sensorially attractive). In another example, one or both surfaces of the panel or layer may in an attractive color (e.g., pink) and be furry to the touch.

In some embodiments, the sensorially attractive puncture-resistant panel includes at least two layers. In this embodiment, one or both of the layers may be as thin as one molecule in thickness. Thus, a panel may be two molecules in thickness (i.e., one molecule from the sensorially attractive layer and one molecule from the puncture-resistant layer). For example, a single molecule thick sheet of graphene that is painted on one surface is a panel in accordance with the definition provided herein. In this scenario, the single molecule-thick layer of graphene is the puncture-resistant layer and the painted surface is the sensorially attractive layer—together, they are a sensorially attractive puncture-resistant panel. Note that while a panel of painted graphene is flexible, it can be laid flat if lain onto a flat surface. The rigidity or flexibility of the panel may depend, for example, on the thickness of the panel or the material used to make the panel.

Note that the dimensions of the sensorially attractive layer and the puncture-resistant layer in the sensorially attractive puncture-resistant panel may be the same, or may be different. In other words, the sensorially attractive layer may be bigger than, approximately equal in size to, or smaller than the puncture-resistant layer.

Figure 5:
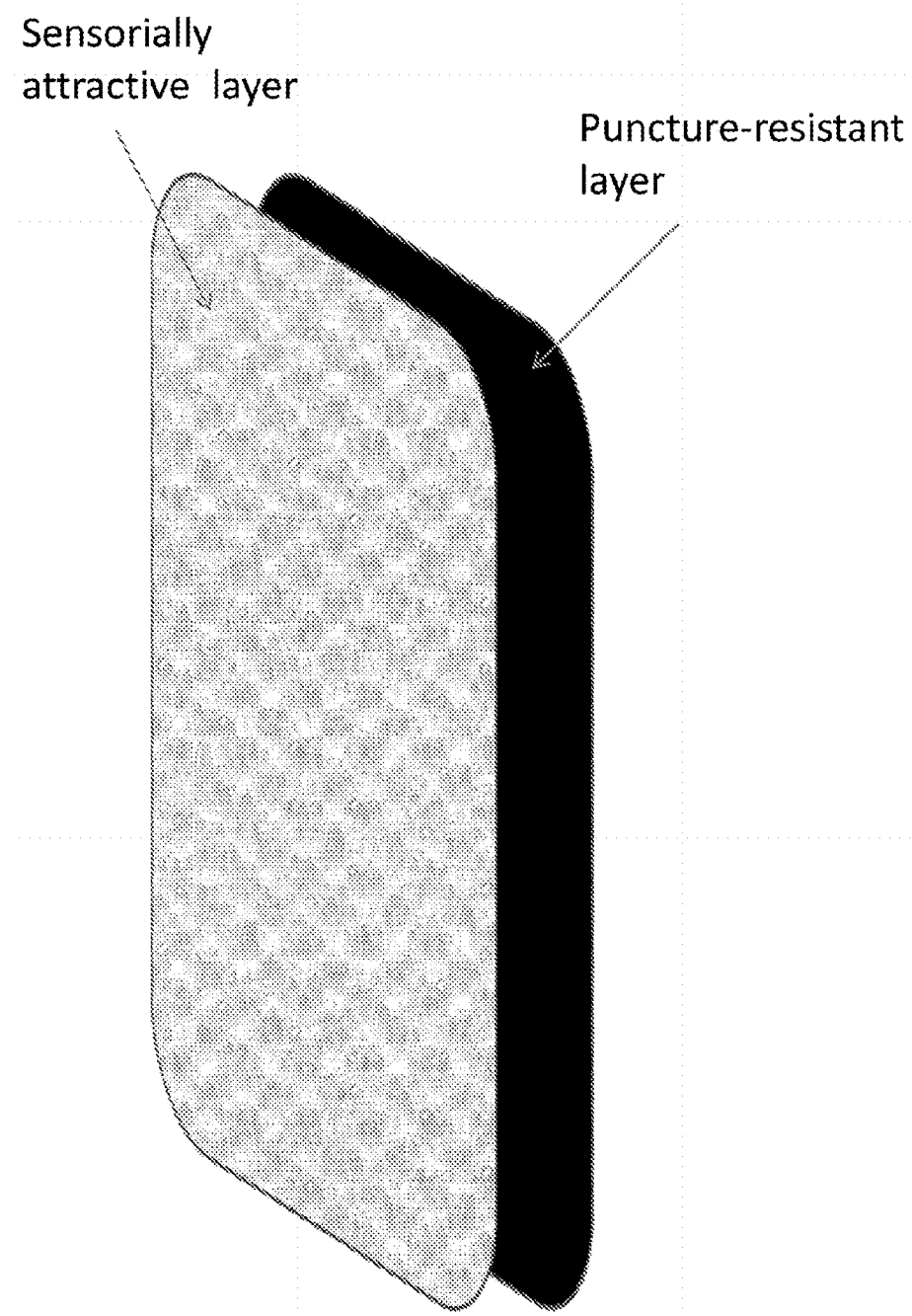
FIG. 5 is a diagram showing an expanded view of a sensorially attractive puncture-resistant panel comprising a sensorially attractive first layer and a puncture-resistant second layer (i.e., the second layer comprises, consists, or consists essentially of a puncture-resistant material).

FIG. 5 is a diagram showing a sensorially attractive puncture-resistant panel comprising two layers of the same size and dimensions, where the first layer is sensorially attractive (because of its color and texture) and the second layer is a puncture-resistant layer (i.e., the second layer comprises, consists, or consists essentially of a puncture-resistant material). In the non-limiting example of a panel depicted in FIG. 5, the panel is both visually attractive (due to its shape) and tactilely attractive (due to the texture on the surface of the sensorially attractive layer.

Note that in FIG. 5, the diagram of the panel is expanded, so that the two layers do not appear to be attached; however, in the panel, where the panel comprises the two layers, the layers are attached to one another.

In some embodiments, the sensorially attractive puncture-resistant panel, or the sensorially attractive layer, or the puncture-resistant layer comprises at least one fastener.

As used herein, by "fastener" is simply any type of adaption or device that allows the sensorially attractive puncture-resistant panel, the sensorially attractive layer, or the puncture-resistant layer to be fastened to something. In the panel depicted in FIG. 4, the surface of the sensorially attractive layer facing the puncture-resistant layer may include a fastener that can join with and attach to a fastener on the sensorially attractive layer-facing surface on the puncture-resistant panel. For example, a hook and loop fastener (such as Velcro) may be used, where the hook component is on one layer and the loop component is on the other.

In another example, a fastener as the term is used herein may be one or more holes in a layer or panel, such that a string, thread, or wire can be threaded through the layer to attach it to something (e.g., another layer) or through the panel to attach it to something (e.g., a piece of clothing). In some embodiments, the hole is less than one centimeter in diameter. In some embodiments, the hole is less than one inch in diameter. In some embodiments, the surface area of the one or more holes is less than or equal to about 20%, or less than about 15%, or less than about 10%, or less than about 5% of the surface area of the layer or panel.

Figure 6:
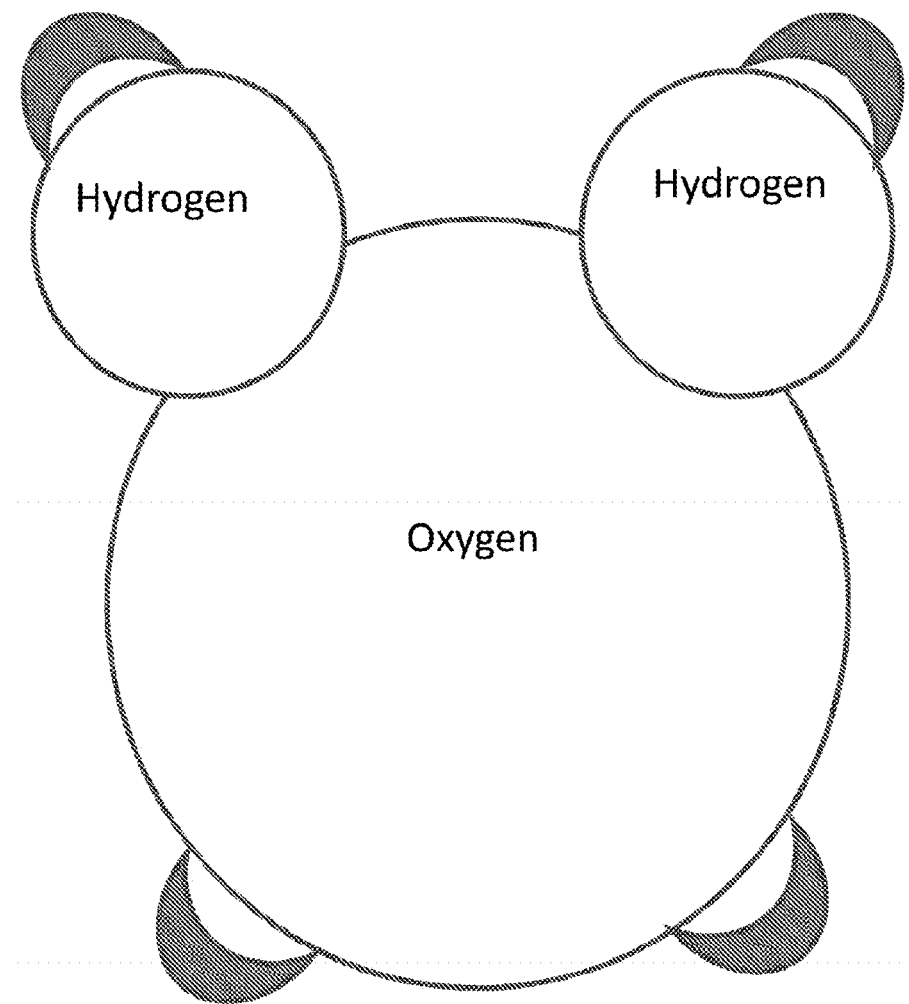
FIG. 6 is a diagram showing the sensorially attractive puncture-resistant panel of FIG. 4 with added loop fasteners can be attached to straps or clips.
Figure 7:
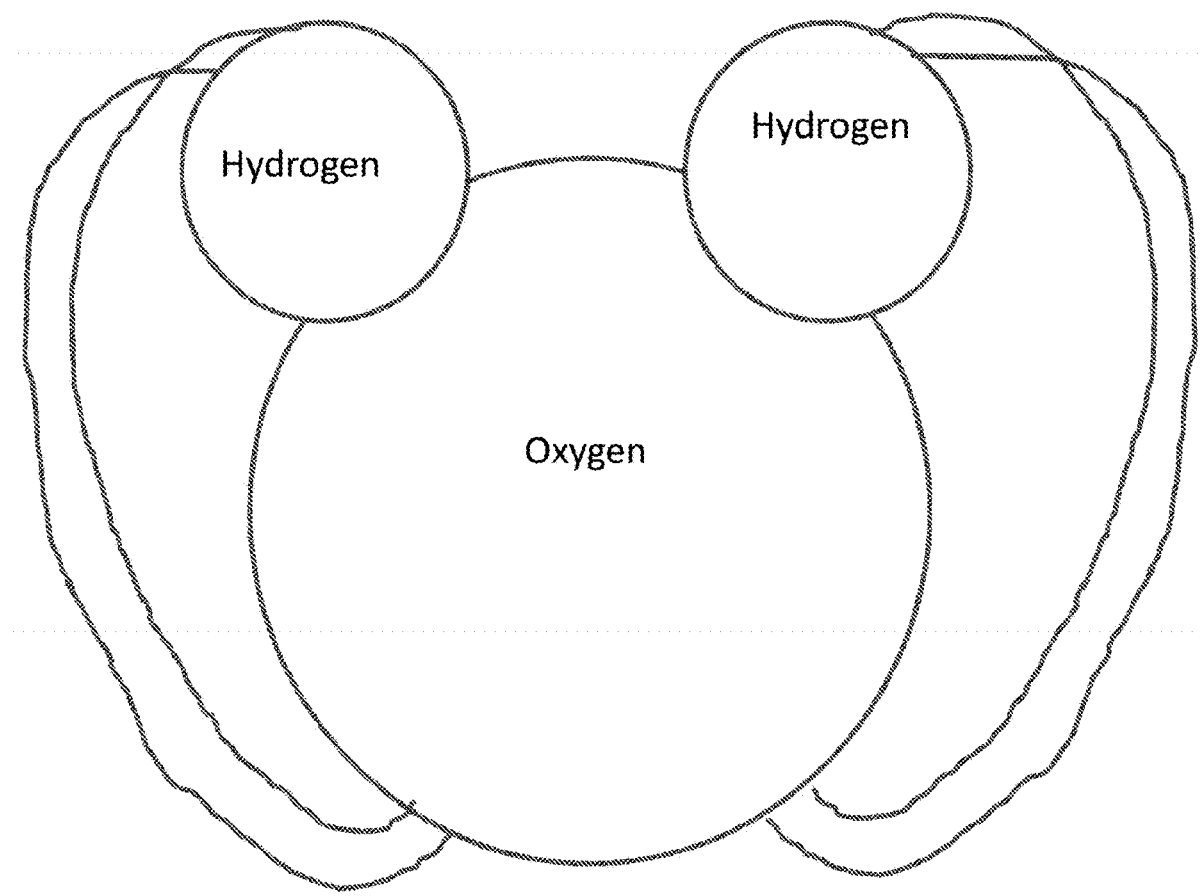
FIG. 7 is a diagram showing the sensorially attractive puncture-resistant panel of FIG. 4 with added fasteners that are arm straps through which arms can be thrust and the panel can be worn on the wearer's chest or back.

A fastener on a sensorially attractive puncture-resistant panel may be used to attach the panel to the inside or outside of a backpack. In the non-limiting example of the water molecule-shaped and colored sensorially attractive puncture-resistant panel in FIG. 4, fasteners are added that are loops that can be attached to straps or clips, with the resulting panel appearing as depicted in FIG. 6. In another non-limiting example, the fasteners on the panel are arm holes through which arms can be thrust and the panel can be worn on the user's chest or back (see FIG. 7).

In some embodiments, the panel further comprises a third layer having a first surface and a second surface, wherein at least one of the first surface and the second surface is sensorially attractive (e.g. is visually and/or tactilely attractive).

In another aspect, the invention provides a sensorially attractive puncture-resistant panel comprising a puncture-resistant layer (i.e., a layer comprising, consisting, or consisting essentially of a puncture-resistant material) sandwiched between at least two sensorially attractive layers. In some embodiments, at least one of the sensorially attractive layers is a layer of stuffing.

In another aspect, the invention provides a sensorially attractive puncture-resistant panel comprising a puncture-resistant layer sandwiched between a first sensorially attractive layer and a third layer that is not puncture-resistant or sensorially attractive.

Figure 8:
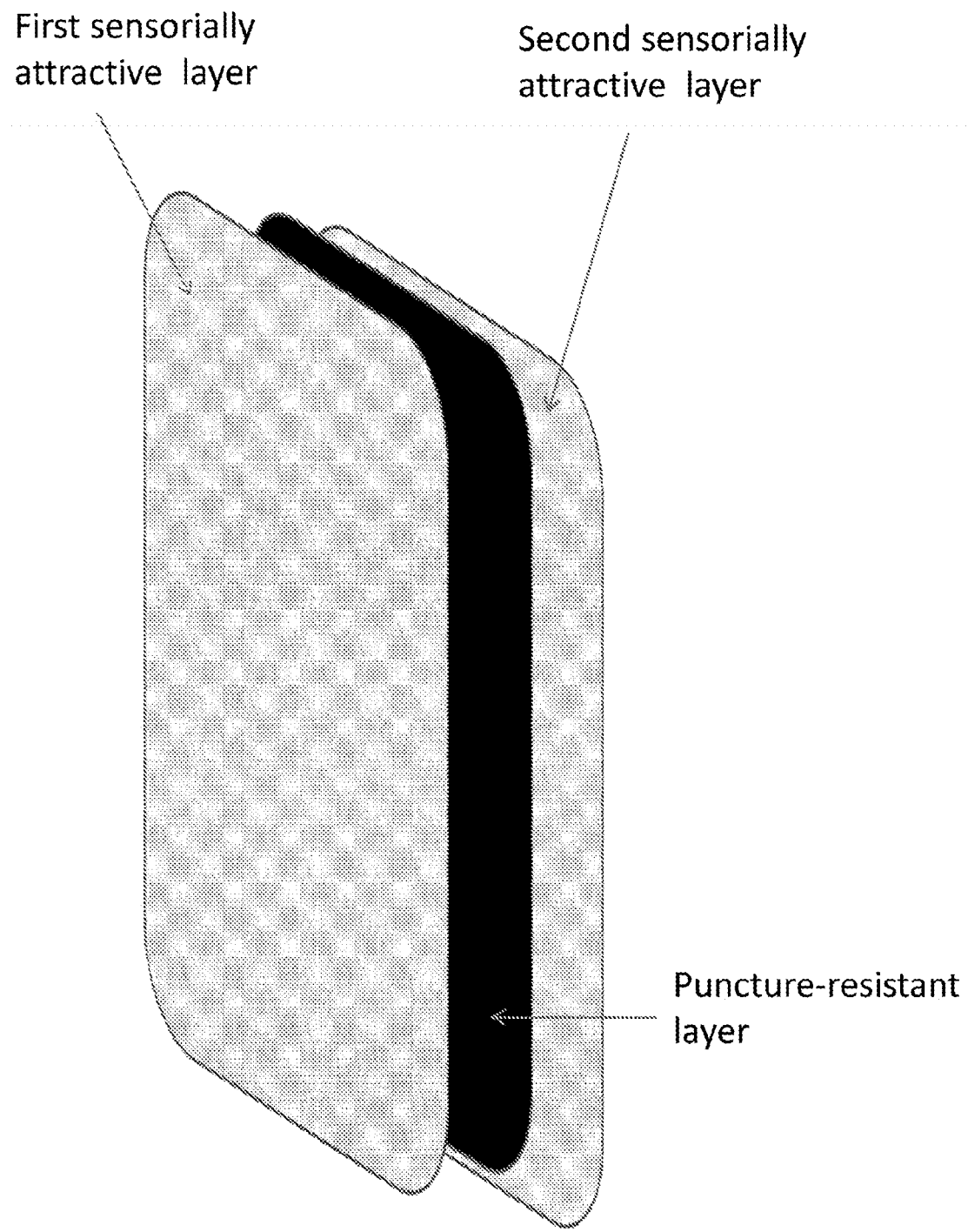
FIG. 8 is a diagram showing an expanded view of a sensorially attractive puncture-resistant panel comprising a puncture-resistant layer sandwiched between two sensorially attractive layers.

FIG. 8 is a diagram showing an expanded view of a non-limiting example of a sensorially attractive puncture-resistant panel comprising a puncture-resistant layer sandwiched between two sensorially attractive layers. Note that in FIG. 8, both the first sensorially attractive layer and the second sensorially attractive layer are sensorially attractive in the same way (i.e., both the first sensorially attractive layer and the second sensorially attractive layer are the same shape, have the same color, have the same texture, and also have the same size). However, the invention contemplates a panel with a third layer that is neither sensorially attractive nor puncture-resistant.

In another aspect, the invention provides a sleeve comprising a first layer and a second layer, each of the first second layers comprising an internal surface and an external surface, the sleeve configured for insertion of a puncture-resistant layer to form a sensorially attractive puncture-resistant panel, wherein the external surface of at least one of the first layer and the second layer is sensorially attractive. In some embodiments, at least one of the first layer and second layer of the sleeve is padded or stuffed. In some embodiments, the internal surface of at least one of the first layer or second layer comprises a fastener for attaching to the puncture-resistant layer following insertion.

In yet another aspect, the invention provides a method for making a sensorially attractive puncture-resistant panel comprising providing a layer comprising puncture-resistant material, and inserting layer comprising the puncture-resistant material into a sleeve comprising an opening, an internal edge, two internal surfaces and two outside surfaces, wherein at least one of the two outside surfaces is sensorially attractive and wherein the puncture resistant material layer is sandwiched between the two internal surfaces in the sleeve. In some embodiments, the opening of the sleeve is permanently or non-permanently closed after the insertion of the puncture-resistant material layer. In some embodiments, the puncture-resistant layer comprises a fastener that attaches to the interior edge or at least one of the two interior surfaces of the sleeve.

In some embodiments, the first layer is permanently attached to the third layer along at least about 5% of a total edge of the first layer or the third layer. In some embodiments, the first layer and the third layer form a sleeve into which the second layer can be inserted to non-permanently (e.g., reversibly) or permanently attach the second layer to the first layer and the third layer.

Figure 9:
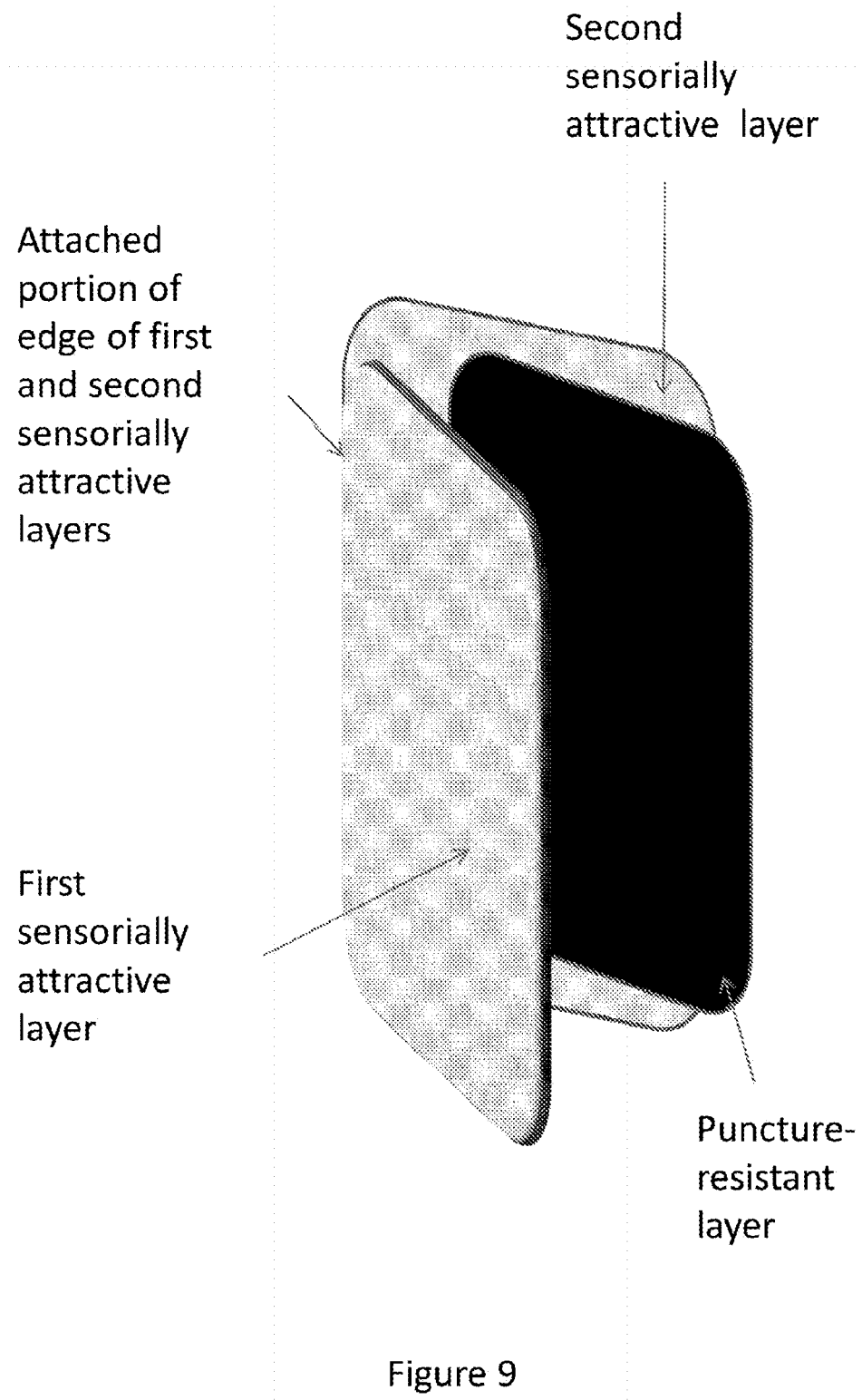
FIG. 9 is a diagram depicting the panel of FIG. 8, where the two sensorially attractive layers are attached along at least 5% of their total edge.

FIG. 9 is a diagram depicting a non-limiting example of an opened panel as described herein comprising two sensorially attractive layers attached along at least 5% of their total edge, and an insertable puncture-resistant layer. In some embodiments, the surface or edge of the puncture resistant layer comprises a fastener that will permanently or non-permanently attach the inserted puncture resistant layer to the internal surface (or internal edge) of the sleeve of the two sensorially attractive layers.

Figure 10:
FIG. 10 is a diagram depicting a sensorially attractive puncture-resistant panel roughly oval in shape with a visually attractive image of a puppy on it.

The sensorially attractive puncture-resistant panel can be of any shape and/or depict any image. In some embodiments, the shape may be roughly oval. For example, the sensorially attractive puncture-resistant panel depicted in FIG. 10 is roughly oval in shape. Note that the shape of the panel depicted in FIG. 10 is asymmetrical and has a visually attractive image of a puppy on it. The puppy image depicted in FIG. 10 may be a sensorially attractive puncture-resistant panel (e.g., the image may be printed directly a puncture-resistant layer) or may be a sensorially attractive layer, where the image is printed onto a layer that is permanently or non-permanently attached to a roughly oval shaped puncture-resistant panel.

Note that where the panel comprises one layer of a puncture-resistant material and second layer that is sensorially attractive, the first layer and the second layer need not be identical in shape and size. Rather, they may only be roughly similar so that when the puncture-resistant material layer and the sensorially attractive layer are attached to each other (e.g., permanently or non-permanently), at least 50%, or at least 75%, or at least 90%, or at least 95%, or at least 99% of the surface area of the puncture-resistant material layer is covered with the sensorially attractive layer. In some embodiments, the sensorially attractive layer is larger than the puncture-resistant material layer. In some embodiments, when the sensorially attractive layer is attached (permanently or non-permanently) to the puncture-resistant material layer, the sensorially attractive layer completely covers (e.g., conceals or hides) the puncture-resistant material layer.

By "non-permanently" attached means that the attachment can be reversed. For example, an attachment by Velcro is a non-permanent attachment.

By "permanent" attachment means that the attachment cannot easily reversed. For example, a sensorially attractive layer glued to a puncture-resistant layer is a permanent attachment. Note that to permanently attach a puncture-resistant material layer to a sensorially attractive layer, any type of attachment can be used including, for example, glue, dye, embroidery, ink (e.g., permanent ink) or paint (e.g., permanent paint), etc.

In some embodiments, when the sensorially attractive layer is sensorially attractive on one surface (e.g., furry on one surface and no-furry on the other, the surface of the sensorially attractive layer that is not sensorially attractive (e.g., the non-furry surface) is the surface that is permanently attached (e.g., glued) or not permanently attached (e.g., attached with hook and loop fasteners such as the Velcro fasteners) to a surface of the puncture-resistant material layer to make a non-limiting sensorially attractive puncture resistant panel of the invention.

Thus, the invention contemplates a sensorially attractive puncture-resistant panel comprising a sensorially attractive layer and a puncture-resistant layer, where the sensorially attractive layer can be replaced. Of course, the invention also contemplates a sensorially attractive puncture-resistant panel comprising a sensorially attractive layer and a puncture-resistant layer, where the sensorially attractive layer cannot be replaced.

In some embodiments the puncture resistant layer is sandwiched between two sensorially attractive layers to make a non-limiting sensorially attractive puncture resistant panel of the invention. In this embodiment, both surfaces of the puncture resistant layer are each covered with a sensorially attractive layer. Note that this embodiment, the two sensorially attractive layers can be sensorially attractive in the same way (e.g., both are furry, or both are the same color or have the same pattern or shape). However, the two sensorially attractive layers need not be sensorially attractive in the same way. For example, one of the two sensorially attractive layers may be plush while the other sensorially attractive layer may be embroidered with the name of the owner or user (e.g., a child or animal) of the sensorially attractive puncture-resistant panel.

In some embodiments, the two sensorially attractive layers are permanently attached to each other. For example, the two sensorially attractive layers are the same shape and size. In some embodiments, if the two sensorially attractive layers are the same shape and size, they may be permanently attached along one edge of the shape (e.g., a straight edge if the shape is roughly polygonal or a curved side if the shape is roughly oval). In some embodiments, two sensorially attractive layers are permanently attached to each other along more than one edge.

In some embodiments, the two sensorially attractive layers are attached to each other along at least about 5% of the total edge of the sensorially attractive layers so that the puncture resistant layer is able to slip in between the two sensorially attractive layers. In this embodiment, the two sensorially attractive layers may resemble a sleeve of a vinyl record or a pillow case, where the puncture resistant layer is the vinyl record or the pillow that is sandwiched between the two sensorially attractive layers. In some embodiments, once the puncture resistant layer is inserted into the sleeve of the two sensorially attractive layers, the non-attached edges of the two sensorially attractive layers are permanently or non-permanently attached to each other, thereby completely enclosing the puncture resistant layer (and, for example, concealing or hiding it) within the two sensorially attractive layers. In some embodiments, if the two sensorially attractive layers are only sensorially attractive on one of their surfaces (e.g., one is plush on one surface and not plush on the other, and the other is printed with a color print on one surface and not printed (or printed less clearly) on the other), the non-plush surface and the non-printed surface are the surfaces that will contact the puncture resistant layer once the layer is inserted.

In some embodiments, where the sensorially attractive puncture-resistant panel comprises two sensorially attractive layers and a puncture-resistant layer, one or both of the two sensorially attractive layers are each sensorially attractive on the front and back surfaces. For example, if the two sensorially attractive layers are attached to each other along their edges to resemble a pillow case, the pillow case can be turned inside out, and the type of sensorially attractive surface of the sensorially attractive puncture-resistant panel will change based whether the pillow case is inside out or outside out when the puncture resistant layer is inserted.

Figure 11:
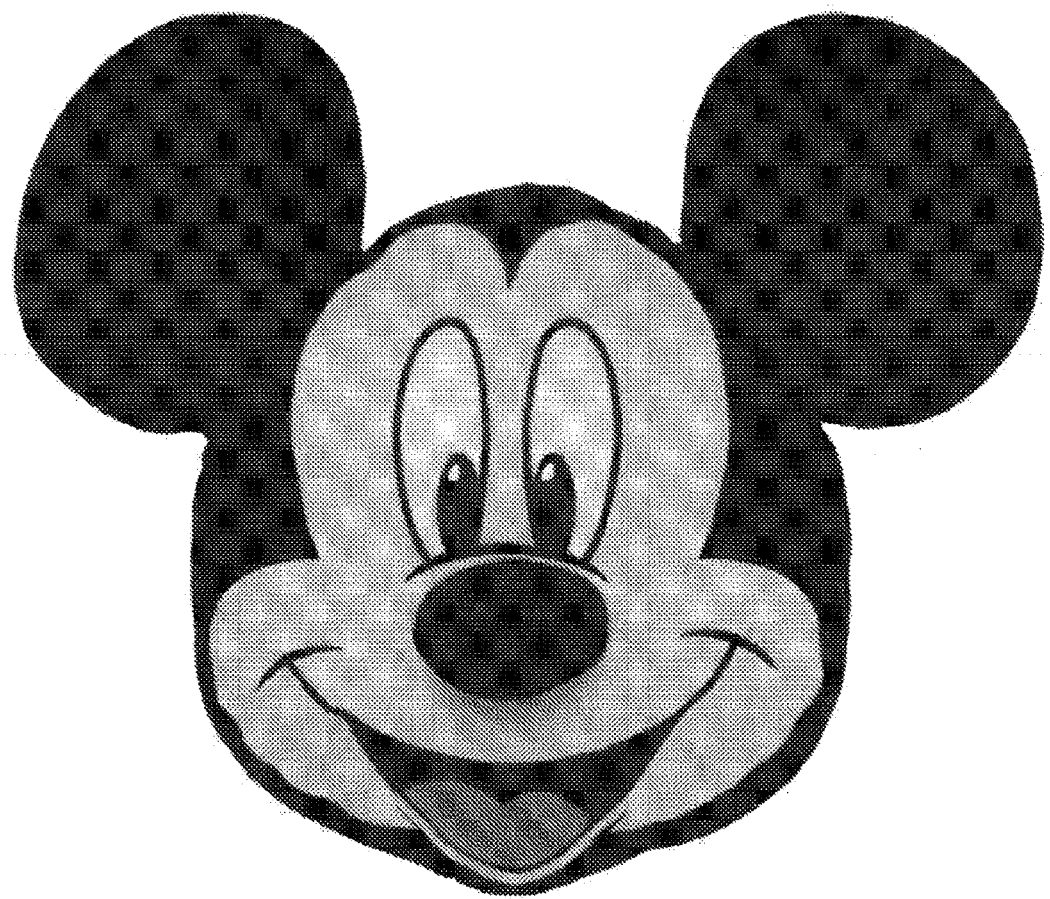
FIG. 11 is a diagram depicting a sensorially attractive layer with the head of Mickey Mouse on its first surface. Note that this layer is both tactilely and visually attractive.

For example, sensorially attractive puncture-resistant panel may comprise a puncture-resistant layer, a first sensorially attractive layer that is sensorially attractive on both surfaces and a second sensorially attractive layer that is sensorially attractive only on its front surface. This is particularly useful as a human child ages, and outgrows a childhood image. For example, the first sensorially attractive layer may be in the shape of a filled water molecule or the head of Mickey Mouse and may have, on its front surface (or "first" surface), the plush surface and color pattern of the head of Mickey Mouse (see FIG. 11) and, on its back surface (or "second" surface), the labeling of the two hydrogen atoms and the oxygen atoms in the water molecule (see FIG. 4). The second sensorially attractive layer may be in the shape of a filled water molecule or the head of Mickey Mouse, but is otherwise plain and thus is sensorially attractive only because of its shape (see FIG. 3). In this example, a young child in preschool or elementary is given a sensorially attractive puncture-resistant panel showing the first surface of the first sensorially attractive layer (i.e., plush surface depicting the head of Mickey Mouse, complete with protruding nose) and the first surface of the second sensorially attractive layer with the puncture-resistant layer in between the two sensorially attractive layers. The puncture-resistant layer can be removed and the first and the second sensorially attractive layers cleaned as necessary. As the child enters her preteen or teenage years, she can update her sensorially attractive puncture-resistant panel by removing the puncture-resistant layer and turning the first and the second sensorially attractive layers inside out (e.g., turning a pillow case inside-out). As a result, her updated sensorially attractive puncture-resistant panel will have exterior-facing surfaces that are the second surface of the first sensorially attractive layer (i.e., depicting the labeled water molecule) and the second surface of the second sensorially attractive layer (i.e., not depicting anything).

In some embodiments, where the sensorially attractive puncture-resistant panel is sensorially attractive because of its shape, the shape may be the outline of an animal, or part of an animal. Note that as the term "animal" is used herein, an animal may be a real-life depiction of an animal (e.g., a photograph), or it may be a drawn or painted imagine of an animal (e.g., a cartoon drawing of an animal). The animal may be real or imagined (e.g., both a unicorn and a yeti are considered animals, as the term is used herein). Extinct species such as dinosaurs and wooly mammoths are also included as animals.

Figure 12:
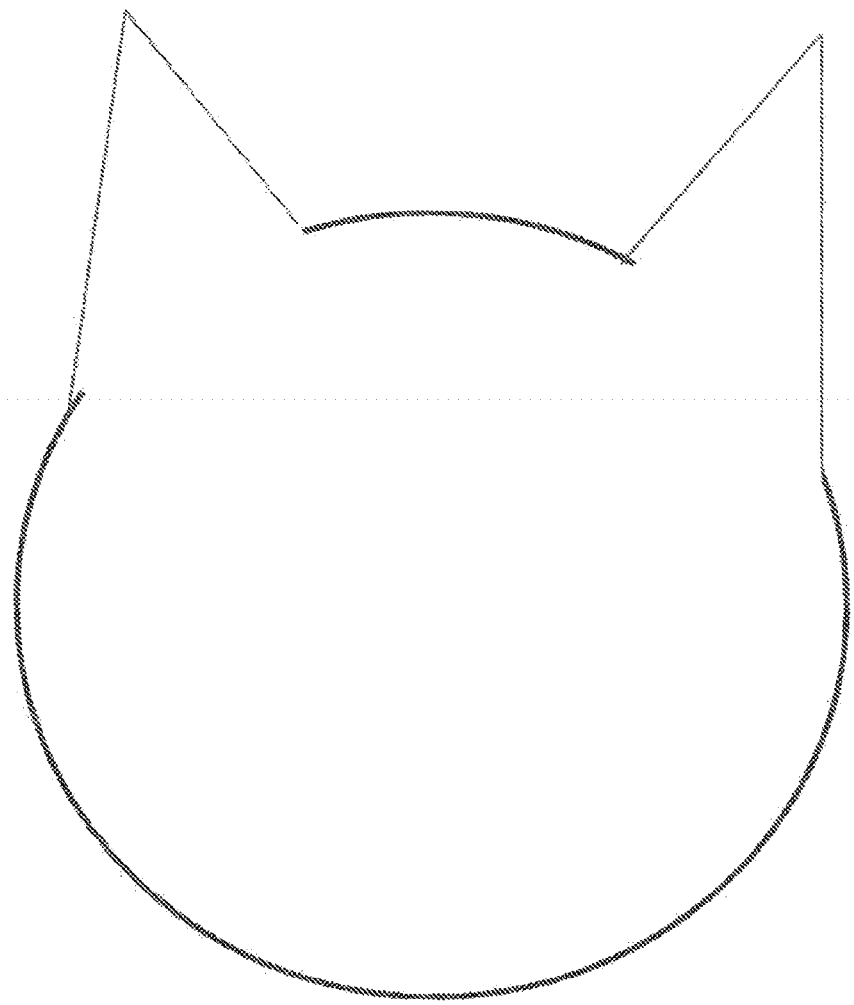
FIG. 12 is a diagram depicting a sensorially attractive puncture-resistant panel in the shape of a cat's head.
Figure 13:
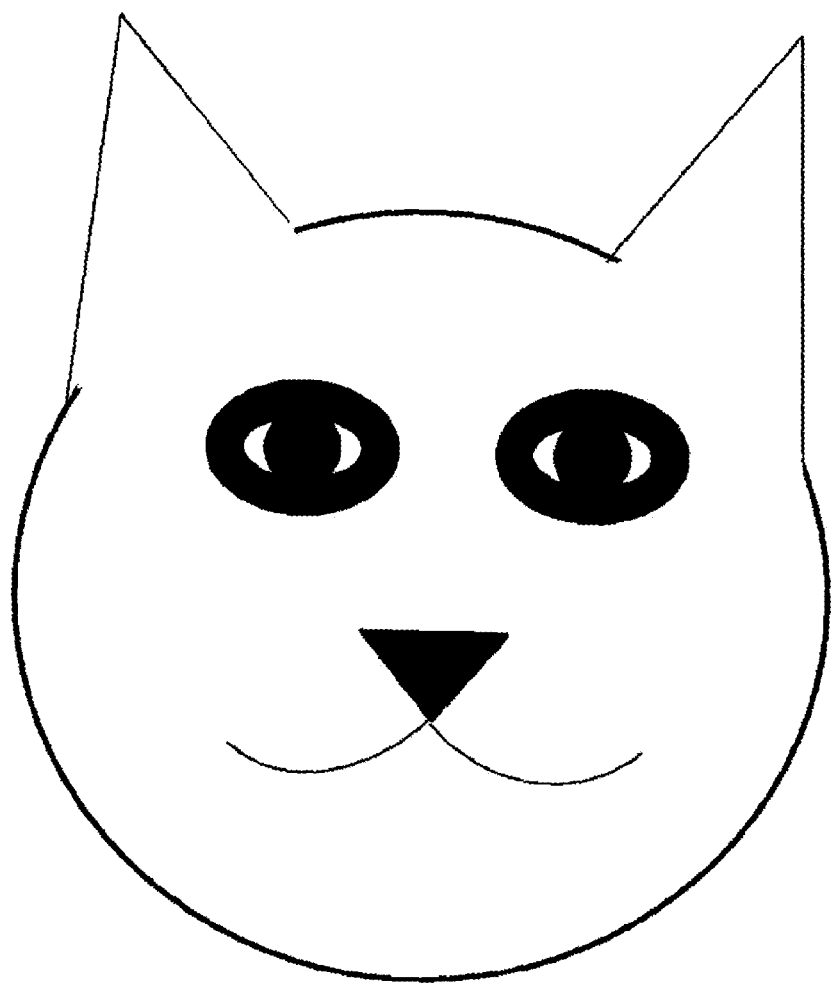
FIG. 13 is a diagram depicting the panel of FIG. 12 labeled with the eyes, nose, and mouth of the cat.

The shape depicted in FIG. 3 is stylistically the shape of a mouse's head. Another non limiting panel in a shape that is sensorially attractive may be, e.g., the shape may have an outline of the head of a cat, where the ears of the cat are represented by triangular shapes and located at approximately 40.degree.-80.degree. angles to each other on a larger center shape that approximately circular shape that is meant to represent the face of the cat. FIG. 12 depicts a shape in the form of a cat's head. FIG. 13 depicts the shape of FIG. 12 labeled with the eyes, nose, and mouth of the cat. In some embodiments, where the panel is a single layer, the labeling of the cat's eyes, nose, and mouth may be printed directly onto the panel (e.g., painted on, drawn on, dyed on, etc.). In some embodiments, where the panel comprises a puncture-resistant layer and a sensorially attractive layer, the labeling of the cat's eyes, nose, and mouth may be permanently (e.g., dyed on, or woven into the layer) or non-permanently (e.g., attached by Velcro hook and loop fasteners, or adhesive tape) to the a sensorially attractive layer. The shape of FIG. 12 or FIG. 13 can be tactilely attractive, of course, by being flurry and/or plush.

In some embodiments, the sensorially attractive puncture-resistant panel is sensorially attractive to a human child (i.e., a living human under the age of 21 years). In some embodiments, the sensorially attractive puncture-resistant panel is sensorially attractive to a human child of between about 1 day to about 18 years of age. In some embodiments, the sensorially attractive puncture-resistant panel is sensorially attractive to a human child of between about two years to about eight years of age. In some embodiments, the sensorially attractive puncture-resistant panel is sensorially attractive to a human child of between about eight years to about fourteen years of age. In some embodiments, the sensorially attractive puncture-resistant panel is sensorially attractive to a human child of between about thirteen to about nineteen years of age. In some embodiments, the sensorially attractive puncture-resistant panel is sensorially attractive to a human child of between about sixteen to about twenty-one years of age.

In some embodiments, the panel is sensorially attractive to an adult human, such as an adult between about 18 to about 21 years of age, or an adult between about 20 to about 35 years of age, or an adult between about 30 to about 45 years of age, or an adult between about 40 to about 60 years of age, or an adult between about 55 to about 75 years of age, or an adult between about 65 to about 100 years of age.

In some embodiments, the panel is sensorially attractive to a non-human animal, such as a pet (e.g., cat, dog, horse, or marine mammal).

In some embodiments, the sensorially attractive puncture-resistant panel is visually attractive. For example, one or both surfaces of the panel can colored (e.g., pink), or can be covered (e.g., by printing or painting) with a design (e.g., a cartoon design). In some embodiments, one or both surfaces of the panel can be covered with the image of a person. For example, for a young child (e.g., aged 2-8 years old), the panel may be visually attractive by having a surface covered with the image of a parent of the child. In another example, the panel may have a surface covered with the image of a famous person (e.g., a famous movie star, sports star, or signer). For example, the image may be the head of Mona Lisa (the famous and possibly real person painted by Leonardo DaVinci).

In some embodiments, the sensorially attractive puncture-resistant panel is attractive to a human adult. For example, if the panel is incorporated into a fanny pack, the panel may be sensorially attractive by having a surface covered with a design saying, for example, "I've got your back".

In some embodiments, the sensorially attractive puncture-resistant panel is, itself, the garment. In some embodiments, the sensorially attractive puncture-resistant panel is in the shape of a coat, a shirt, a hat, or a pair of pants.

In some embodiments, the sensorially attractive puncture-resistant panel includes multiple layers.

Figure 14:
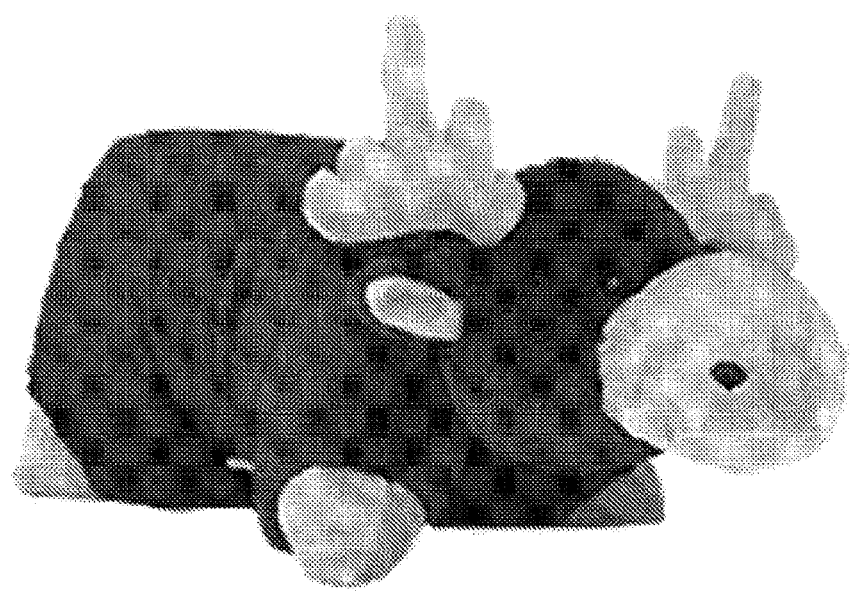
FIG. 14 is a photograph depicting a moose Pillow Pet in the folded position.
Figure 15:
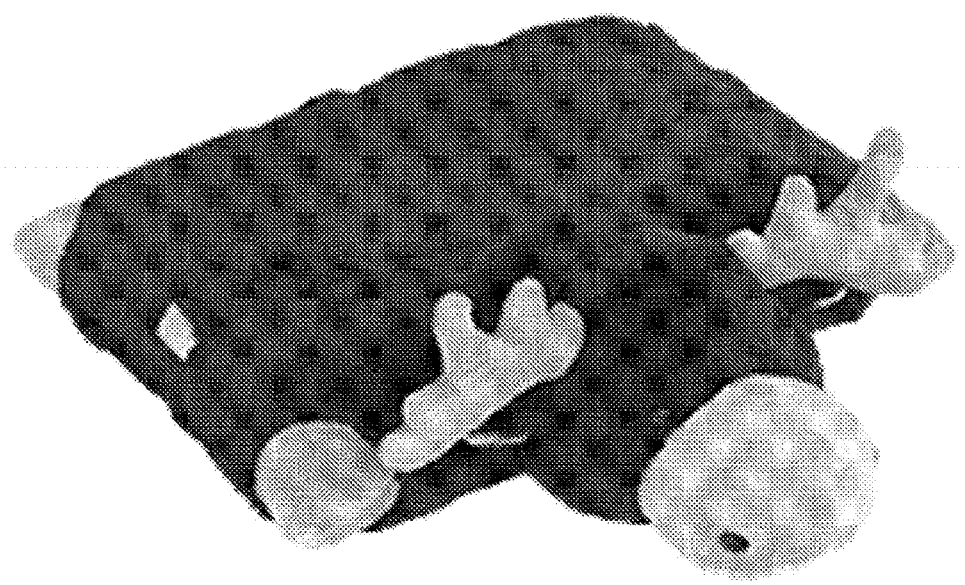
FIG. 15 is a photograph depicting the moose of FIG. 14 is the open (i.e., unfolded) position.

In some embodiments, sensorially attractive puncture-resistant panel intended to be a toy and thus is attractive to a human. For example, the invention contemplates a sensorially attractive puncture-resistant panel in the shape of a stuff animal themed pillow. The Pillow Pet brand of pillows are plush-covered pillows having animal or cartoon themes that are roughly rectangular when open but can be folded along the middle and held closed with a hook and loop fastener (e.g., Velcro) to form the shape of the cartoon or the animal. FIGS. 14 and 15 show a moose Pillow Pet. FIG. 14 shows the moose held closed with the hook and loop fastener being attached to form a moose shaped stuffed animal. FIG. 15 shows the moose open to form a pillow shape with features of the moose on the pillow, where the unfastened hook and loop fastener is visible as a white region the side of the pillow.

In a sensorially attractive puncture-resistant panel that is a pillow (e.g., similar to a Pillow Pet), the puncture-resistant layer is sandwiched within the layers of the plush layers (which are sensorially attractive). For example, the puncture-resistant layer can be located directly adjacent to the bottom plush layer (where the plush faces away from the bottom surface of the puncture-resistant layer). The bottom surface of a stuffing layer (where the stuffing is sensorially attractive by being tactilely attractive) may contact the top surface of the puncture-resistant layer. The top surface of the stuffing layer may then contact the non-plush bottom surface of the plush top surface of the top plush layer. Of course, the top surface of the stuffing layer may be plush; thus, the pillow may comprise only three layers.

In some embodiments, at least about 5% of the total edge of the top sensorially attractive layer is attached, either permanently or non-permanently, to at least a portion the total edge of the bottom sensorially attractive layer in a sensorially attractive puncture-resistant panel. In some embodiments, at least about 10%, or at least about 20%, or at least about 40%, or at least about 50% of the total edge of a sensorially attractive layer is permanently or non-permanently attached to at least a portion the total edge of the bottom sensorially attractive layer in a sensorially attractive puncture-resistant panel. For example, a standard pillow in the US has the dimension of 20 inches by 26 inches (or 51 cm by 66 cm).

Therefore, if the sensorially attractive puncture-resistant panel has the dimension of a standard US pillow, the total length of the edge is 20.times.2 plus 26.times.2 inches, or 92 inches. Therefore, "at least about 5%" means at least about 5% of 92 inches or 4.6 inches.

Note that when the sensorially attractive puncture-resistant panel comprises a top sensorially attractive layer attached along at least one edge to a bottom sensorially attractive layer, and an insertable puncture-resistant layer, when the puncture-resistant layer is inserted, unattached edges of the top sensorially attractive layer and the bottom sensorially attractive layer may be non-permanently or permanently attached to each other, thereby enclosing the puncture-resistant layer within the panel. In some embodiments, the enclosed puncture-resistant layer is concealed within the joined top sensorially attractive layer and the bottom sensorially attractive layer.

In another embodiment, a sensorially attractive panel that is a pillow (e.g., similar to a Pillow Pet) can be made as follows. A padded "pillowcase" or sleeve" is configured to contain an inserted puncture-resistant layer. The padded sleeve may comprise an outer surface that is plush (and colored with the design of the intended animal or cartoon image), stuffing as a middle layer and an internal layer that may be, for example, smooth, is prepared. The internal layer may have fasteners (e.g., one of the fasteners of a hook and loop fastener) attached to it to hold a puncture-resistant layer in place when the puncture-resistant layer is inserted into the pillowcase. The top and bottom layers of the padded sleeve are non-permanently or permanently attached once the puncture-resistant layer is inserted.

For the sensorially attractive panel that is a pillow, the pillow may have no design at all, and is sensorially attractive by being tactilely attractive (e.g., soft to the touch from the stuffing). The sensorially attractive panel that is a pillow can be in any shape including, without limitation, rectangular, squarish, eliptical, circular, etc.

In some embodiments, the sensorially attractive panel that is a pillow (e.g., similar to a Pillow Pet) can be in the shape and/or design of an animal (e.g., dog, cat, horse, unicorn, cow, dragon, dinosaur, etc.) or cartoon character (e.g., SpongeBob Squarepants, Dora the Explorer, Bob the Builder, Pokemon, Bugs Bunny, Mickey Mouse, etc.).

The puncture-resistant material in the sensorially attractive puncture-resistant panel described herein is a strong material that is resistant to being pierced by, for example, a bullet shot from a gun or rifle, or a knife. Non-limiting puncture-resistant materials include, for example, materials made of aramid fibers (including meta-aramid fiber or para-aramid fiber). In some embodiments, an aramid fiber is a manufactured fiber in which the fiber-forming substance is a long-chain synthetic polyamide in which at least 85% of the amide linkages, (—CO—NH—) are attached directly to two aromatic rings. Aramid fiber materials are commercially available and include HT-1 (sold by DuPont), Nomex (sold by Dupont) Cones (sold by Teijin), Arawin (sold by Toray), New Start (sold by Yantai Tayho), X-Fiper (sold by SRO Group), Kermel (sold by Kermel), polyaramid poly(phenylene diamine terephthalamide) fabric (sold by Dupont under the registered name of KEVLAR®), and Twaron (sold by Teijin).

The puncture-resistant materials that can be used in the sensorially attractive puncture-resistant panel described herein can include, without limitation, materials made of carbon fibers, or interlocked carbon atoms. For example, graphene is puncture-resistant material that can be used in the sensorially attractive puncture-resistant panel described herein. Graphene is a crystalline allotrope of carbon with 2-dimensional properties. The carbon atoms in graphene are densely packed in a regular atomic-scale chicken wire (hexagonal) pattern (see, e.g., Novoselov, K S.; Geim, A. K.; Morozov, S. V.; Jiang, D.; Zhang, Y.; Dubonos, S. V.; Grigorieva, I. V.; Firsov, A. A., "Electric Field Effect in Atomically Thin Carbon Films", Science 306 (5696): 666-669, 2004, incorporated herein by reference in its entirety).

Note that the term "graphene" as used herein may include one or more layers of graphene, since a single layer of graphene is only one atom-thick. Work by Lee et al. recently showed that graphene is not pierced by a high speed microscopic bullet (see Lee, Loya, Lou, and Thomas, Science 346(6213): 1092-1096, 2014, incorporated herein by reference in its entirety).

The puncture-resistant materials that can be used in the sensorially attractive puncture-resistant panel described herein can include, without limitation, materials made of ceramics. Other puncture-resistant materials that can be used in the sensorially attractive puncture-resistant panel are known and include, without limitation, fiberglass and fiberglass woven with resin.

Puncture-resistant materials and methods for making puncture-resistant layers therefrom are disclosed, for example, in U.S. Pat. Nos. 3,649,426; 7,562,612; 7,226,878; 6,500,507; 6,537,654; 6,389,594, GB Patent No. 1352418; U.S. Pat. Nos. 8,291,808; 8,695,476; PCT Publication No. WO 2009/048676; and U.S. Pat. No. 8,215,223; the entire disclosures of all of the foregoing are herein incorporated herein by reference.

In embodiments, the puncture-resistant material in the puncture-resistant panel is at least a type I level (standards of the US National Institute of Justice) that will protect against 2.6 g (40 gr) .22 Long Rifle Lead Round Nose (LR LRN) bullets at a velocity of 329 m/s (1080 ft/s.+-.30 ft/s) and 6.2 g (95 gr) 0.380 ACP Full Metal Jacketed Round Nose (FMJ RN) bullets at a velocity of 322 m/s (1055 ft/s.+-.30 ft/s).

In some embodiments, the puncture-resistant material in the puncture-resistant panel is at least a type IIA level (standards of the US National Institute of Justice) that will protect against 8 g (124 gr) 9.times.19 mm Parabellum Full Metal Jacketed Round Nose (FMJ RN) bullets at a velocity of 373 m/s.+-.9.1 m/s (1225 ft/s.+-.30 ft/s); 11.7 g (180 gr) 0.40 S&W Full Metal Jacketed (FMJ) bullets at a velocity of 352 m/s.+-.9.1 m/s (1155 ft/s.+-.30 ft/s) and 14.9 g (230 gr) 0.45 ACP Full Metal Jacketed (FMJ) bullets at a velocity of 275 m/s.+-.9.1 m/s (900 ft/s.+-.30 ft/s). Conditioned armor protects against 8 g (124 gr) 9 mm FMJ RN bullets at a velocity of 355 m/s.+-.9.1 m/s (1165 ft/s.+-.30 ft/s); 11.7 g (180 gr) 0.40 S&W FMJ bullets at a velocity of 325 m/s.+-.9.1 m/s (1065 ft/s.+-.30 ft/s) and 14.9 g (230 gr) 0.45 ACP Full Metal Jacketed (FMJ) bullets at a velocity of 259 m/s.+-.9.1 m/s (850 ft/s.+-.30 ft/s). Note that the type IIA level also offers the same protection as the type I level.

In some embodiments, the puncture-resistant material in the puncture-resistant panel is at least a type II level (standards of the US National Institute of Justice) that will protect against 8 g (124 gr) 9 mm FMJ RN bullets at a velocity of 398 m/s.+-.9.1 m/s (1305 ft/s.+-.30 ft/s) and 10.2 g (158 gr) 0.357 Magnum Jacketed Soft Point bullets at a velocity of 436 m/s.+-.9.1 m/s (1430 ft/s.+-.30 ft/s). Conditioned armor protects against 8 g (124 gr) 9 mm FMJ RN bullets at a velocity of 379 m/s.+-.9.1 m/s (1245 ft/s.+-.30 ft/s) and 10.2 g (158 gr) 0.357 Magnum Jacketed Soft Point bullets at a velocity of 408 m/s.+-.9.1 m/s (1340 ft/s.+-.30 ft/s). Note that the type II level also offers the same protection as the type IIA and type I levels.

In some embodiments, the puncture-resistant material in the puncture-resistant panel is at least a type IIIA (standards of the US National Institute of Justice) that will protect against 8.1 g (125 gr) 0.357 SIG FMJ Flat Nose (FN) bullets at a velocity of 448 m/s.+-.9.1 m/s (1470 ft/s.+-.30 ft/s) and 15.6 g (240 gr) 0.44 Magnum Semi Jacketed Hollow Point (SJHP) bullets at a velocity of 436 m/s (1430 ft/s.+-.30 ft/s). Conditioned armor protects against 8.1 g (125 gr) 0.357 SIG FMJ Flat Nose (FN) bullets at a velocity of 430 m/s.+-.9.1 m/s (1410 ft/s 30 ft/s) and 15.6 g (240 gr) 0.44 Magnum Semi Jacketed Hollow Point (SJHP) bullets at a velocity of 408 m/s.+-.9.1 m/s (1340 ft/s.+-.30 ft/s). Note that the type IIIA level also offers the same protection as the type II, type IIA and type I levels.

In some embodiments, the puncture-resistant material in the puncture-resistant panel is at least a type III (standards of the US National Institute of Justice) that will protect against 9.6 g (148 gr) 7.62.times.51 mm NATO M80 ball bullets at a velocity of 847 m/s.+-.9.1 m/s (2780 ft/s.+-.30 ft/s). Note that the type III level also offers the same protection as the type IIIA, type II, type IIA and type I levels.

In some embodiments, the material in the puncture-resistant panel is at least a type IV (standards of the US National Institute of Justice) that will protect against 10.8 g (166 gr) 0.30-06 Springfield M2 armor-piercing (AP) bullets at a velocity of 878 m/s.+-.9.1 m/s (2880 ft/s.+-.30 ft/s). Note that the type IV level also offers the same protection as the type III, type IIIA, type II, type IIA and type I levels.

As used herein, by "garment" is meant any type of material worn by a wearer over at least part of the body of the wearer. The wearer may be a human or may be a non-human animal. Where the wearer is a human, the garment may cover only a small part of the wearer (e.g., a belt worn around the waist), or may cover a large part of the wearer (e.g., a full-length coat worn over the body).

In some embodiments, the sensorially attractive puncture-resistant panel is incorporated into part or all of a bag or garment meant to be worn by a living wearer, such as a human or other animal (e.g., a dog or a horse). In some embodiments, the panel is incorporated into a bag or garment meant to be worn around the torso of the wearer. In some embodiment where the panel is sensorially attractive because it is tactilely attractive, the surface of the panel faces the wearer. As a non-limiting example, if the panel is incorporated into a vest worn by a service dog, the tactilely attractive surface of the panel faces the dog and touches the dog's hair or fur. In another non-limiting example, if the panel is incorporated into a backpack or fanny pack worn by a human, the tactilely attractive surface of the panel faces the human and touches the human's skin or touches the clothing covering the human.

Example 1

The below is a prophetic example of a sensorially attractive puncture-resistant panel as described herein.

A parent who is about to send her three year old daughter to preschool purchases for insertion into the child's backpack a sensorially attractive puncture-resistant panel comprising three layers. The first, internal layer is removable and is a puncture-resistant layer (e.g., oval in shape), and the second and third external layers are sensorially attractive and are attached to one another to form a padded sleeve or pillowcase in the shape of an oval that is stuffed with polyester fiber stuffing and is covered with fuzzy pink fur. The opening of the sleeve is able to be non-permanently closed (e.g., closed with hook and loop fasteners or a button fastener), thereby enclosing the removable puncture-resistant layer inside when the opening is closed. The puncture-resistant layer is thus covered on both sides with the padded, fuzzy pink fur. The parent places the sensorially attractive puncture-resistant panel in her daughter's backpack and routinely removes and washes the sleeve as needed, and then replaces the puncture-resistant layer into the washed fuzzy, padded pink fur sleeve.

When the daughter is about to start fourth grade at the age of 9, the daughter wishes to replace the fuzzy pink padded sleeve with an image of a male pop star whose song is frequently played on the radio and whose videos are often viewed on YouTube. The parent discards the padded fuzzy pink fur sleeve and purchases a non-padded sleeve depicting, on one outward-facing surface of one of the layers of the sleeve, a picture of the famous male pop star. The mother customizes the sleeve on the outward-facing surface of the other layer of the sleeve (i.e., the surface not depicting the famous male pop star) with the daughter's name by writing the daughter's name onto the surface in permanent ink. The mother places the puncture-resistant layer into the new sleeve to make a sensorially attractive puncture-resistant panel. The daughter continues to include the sensorially attractive puncture-resistant panel in her backpack.

When the daughter is about to start ninth grade at the age of 14, the daughter has become interested in chemistry. The daughter goes to an online store and uses her allowance to purchase an oval sleeve depicting the periodic table of elements on one of the surfaces of the sleeve. She removes the sleeve depicting the image of the male pop star and places the puncture-resistant layer into the new sleeve depicting the periodic table of elements on one outer surface to make a sensorially attractive puncture-resistant panel. The sensorially attractive puncture-resistant panel depicting the periodic table is useful, and the daughter frequently removes it from her backpack and keeps it at her desk to consult, particularly during her science classes and labs, her math classes, and also during study hall where she frequently does her chemistry homework. One day when she is 16 during chemistry lab in her third year of high school, a glass beaker is placed too close to a Bunsen burner and explodes. The daughter, seeing the beaker glowing red moment before it explodes, grabs her sensorially attractive puncture-resistant panel and uses it to cover her face seconds before the beaker explodes. Her arms and neck are cut with the shards of glass flying from the exploding beaker but the sensorially attractive puncture-resistant panel protects her face from injury from the flying shards of glass.

Example 2

The below is a prophetic example of a sensorially attractive puncture-resistant panel as described herein.

During a baby shower, an expectant mother is given a sensorially attractive puncture-resistant panel that is a pillow in the shape of an elephant. The elephant pillow can be folded (and held folded by a Velcro strap) to form a stuffed animal, or can be unfolded (by undoing the Velcro strap) to form a flat, roughly rectangularly shaped pillow (albeit stuffed pillow). The puncture-resistant layer within the pillow is flexible and is permanently sealed within the pillow. In other words, the puncture-resistant layer cannot be seen from the outside of the elephant pillow.

Once the baby is born, the elephant pillow is used by the child as a pillow and the child takes the elephant to daycare when he starts at the age of three months.

The elephant pillow becomes the favorite toy of the child. As the child ages, his mother tells him to hold his pillow over his chest if he is ever scared. The child brings his elephant pillow with him everywhere (e.g., to restaurants, in the car, etc.)

During a car ride to elementary school, the mother and child get into a car accident. The accident results in shards of metal flying at a velocity similar to a bullet shot by a gun. One shard flies into the backseat of the car and hits the child. The child is asleep at the time of the accident, and is clutching the pillow over his chest when he is hit by the shard of metal. The puncture-resistant layer in the pillow stops the shard of metal from passing through the pillow and impaling the child. The child survives the car accident unharmed.

Example 3

The below is a prophetic example of a sensorially attractive puncture-resistant panel as described herein.

An elementary school child hears about a shooting at another elementary school in the state that the child lives in. The child becomes afraid to go to school. However, because he has become aware that being afraid may have him labeled as a coward by his peers, he is reluctant to share his fears with his peers.

The parents of the child purchase a sensorially attractive puncture-resistant panel that he can carry in his backpack and with him as he goes throughout his day. The child and his parents purchase a sensorially attractive puncture-resistant panel that bears the image of SpongeBob Squarepants on one surface. The other surface of the panel contains a clear plastic-film covered pocket. The parents insert a calendar into the pocket. The child is happy to carry the sensorially attractive puncture-resistant panel in his backpack daily, and since the calendar is useful, his teachers do not object to his having the panel at his desk during the school day. As a result, the child loses his fear of attending school.

Example 4

The below is a prophetic example of a sensorially attractive puncture-resistant panel as described herein.

Figure 16:
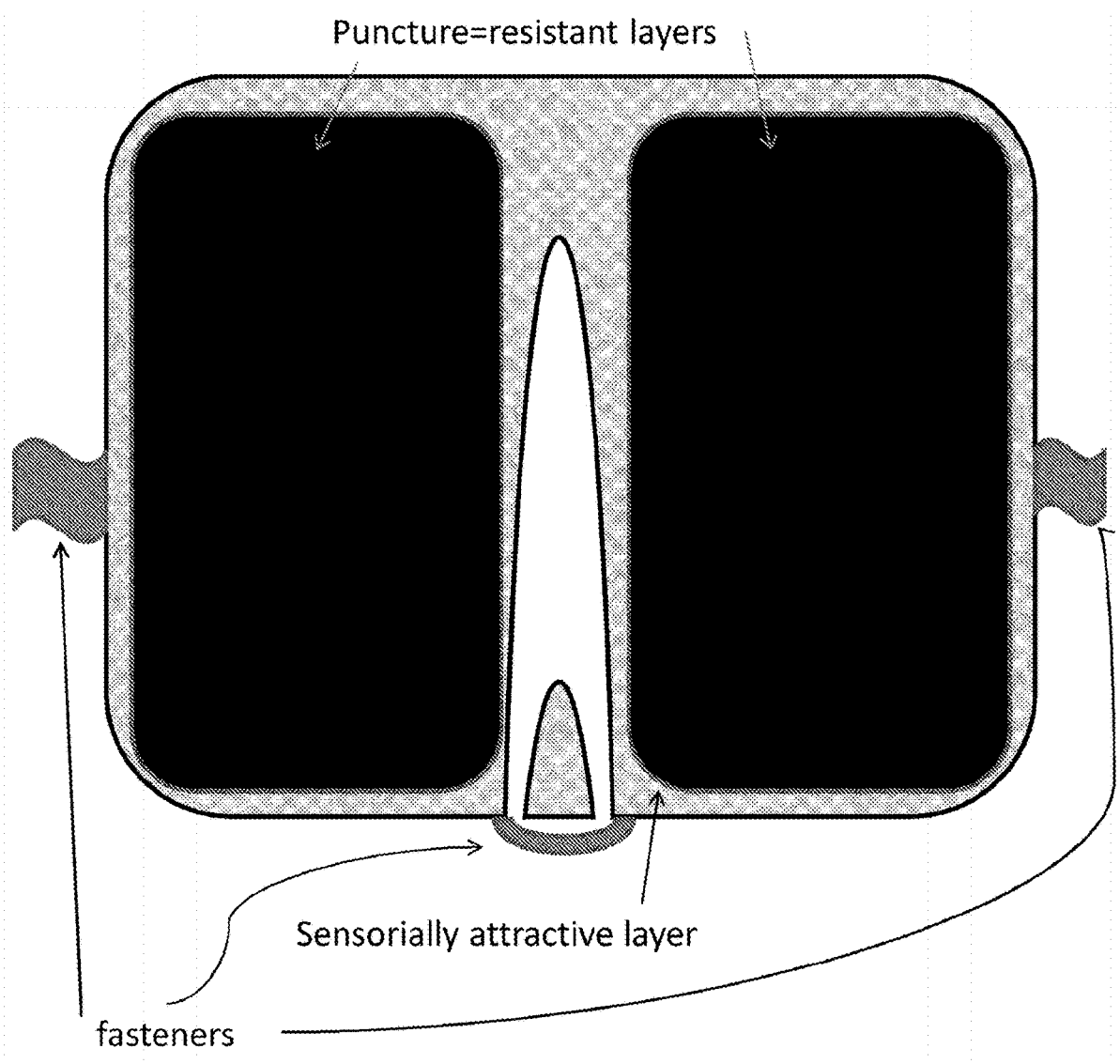
FIG. 16 is a diagram depicting a sensorially attractive puncture-resistant panel for dolphins to wear when they are at work searching for mines.

A country with a large coastline has recently signed a peace agreement ending a long and ongoing war. However, during the war, mines were laid in the ocean by both the country itself and its enemy. As the ocean currently can dislodge the mines or bury them with sand and silt, the country has trained dolphins to aid in mine detection. This is very difficult and dangerous work, with a high casualty rate from the explosion of detected mines. Dolphins are valuable animals, being expensive to feed and train. To reduce the loss of these valuable animals, the country purchases a number of sensorially attractive puncture-resistant panels for the dolphins to wear when they are at work searching for mines. FIG. 16 shows a schematic of the panel described here. The black rectangles with rounded corners are two puncture-resistant layers and the light blue-textured layer is a sensorially attractive layer. Note that the sensorially attractive layer has a slit in the middle to accommodate the dolphin's dorsal fin and has a fastener that closes the slit and prevents the panel from sliding forward or backwards off the dolphin, depending upon if the panel shown in FIG. 16 is with the closed portion of the slit facing the dolphin's head or the dolphin's tail. The sensorially attractive layer also comprises two fasteners that will attach to each other underneath the dolphin's belly. Note that the sensorially attractive layer is sensorially attractive on the surface that touches the skin of the dolphin. Likewise, the edge of the sensorially attractive layer that surrounds the dorsal fin is padded and smooth, so that wearing the panel will be sensorially acceptable to the dolphin.

The panel of FIG. 16 is placed onto the dolphin prior to the dolphin's mine detecting activities and removed following the return of the dolphin. Note that in some embodiments, the panel shown in FIG. 16 fully encircles the girth of the dolphin, and the fasteners are such that they attach when one end of the panel overlaps the other, thereby fully covering the dolphin's chest and belly.

Wearing the sensorially attractive puncture-resistant panel, the dolphin is comfortable, and yet safe from potential particles flying from an exploding mine.

The embodiments of the invention described above are intended to be merely exemplary; numerous variations and modifications will be apparent to those skilled in the art. All such variations and modifications are intended to be within the scope of the present invention as defined in any appended claims.

What is claimed:

1. A sensorially attractive puncture-resistant panel that is configured to be folded to form a stuffed animal and unfolded to form a pillow, the panel comprising a puncture-resistant layer sandwiched between at least two sensorially attractive layers, said at least two sensorially layers forming a sleeve that resembles a cartoon character or an animal.

2. The panel of claim 1, wherein at least one of the at least two sensorially attractive layers is a layer of stuffing.

3. A method for making a sensorially attractive puncture-resistant panel that is configured to be folded to form a stuffed animal and unfolded to form a pillow, the panel comprising:
    (a) providing a layer comprising puncture-resistant material, and
    (b) inserting the puncture-resistant layer into a padded or stuffed sleeve comprising an opening, an internal edge, two internal surfaces and two outside surfaces, wherein at least one of the two outside surfaces is sensorially attractive and wherein the puncture-resistant layer is sandwiched between the two internal surfaces in the sleeve.

4. The method of claim 3, wherein the opening of the sleeve is permanently or non-permanently closed after the insertion of the puncture-resistant material layer.

5. The method of claim 3, wherein the puncture-resistant layer comprises a fastener that attaches to the internal edge or at least one of the two internal surfaces of the sleeve.

\* \* \* \* \*